(12) United States Patent
Chand et al.

(10) Patent No.: US 7,040,147 B2
(45) Date of Patent: May 9, 2006

(54) METHOD AND APPARATUS FOR MANIPULATING A SAMPLE

(75) Inventors: Ami Chand, Goleta, CA (US); Kevin J. Kjoller, Santa Barbara, CA (US); Kenneth L. Babcock, Santa Barbara, CA (US); Michael K. Harris, Santa Barbara, CA (US)

(73) Assignee: Veeco Instruments Inc., Woodbury, NY (US)

( * ) Notice: Subject to any disclaimer, the term of this patent is extended or adjusted under 35 U.S.C. 154(b) by 0 days.

(21) Appl. No.: 11/075,019

(22) Filed: Mar. 8, 2005

(65) Prior Publication Data

US 2005/0145021 A1    Jul. 7, 2005

Related U.S. Application Data

(60) Division of application No. 09/904,634, filed on Jul. 13, 2001, now Pat. No. 6,862,921, which is a continuation-in-part of application No. 09/855,960, filed on May 15, 2001, now Pat. No. 6,530,268, which is a continuation-in-part of application No. 09/803,268, filed on Mar. 9, 2001, now Pat. No. 6,612,160.

(51) Int. Cl.
*G12B 21/20* (2006.01)
*G01N 13/10* (2006.01)

(52) U.S. Cl. .................................................. 73/105
(58) Field of Classification Search ............... 73/105; 250/306

See application file for complete search history.

(56) References Cited

U.S. PATENT DOCUMENTS

| | | | | | |
|---|---|---|---|---|---|
| 5,343,042 | A | * | 8/1994 | Fuchs et al. | 250/307 |
| 5,461,907 | A | * | 10/1995 | Tench et al. | 73/105 |
| 5,504,338 | A | * | 4/1996 | Marrian et al. | 250/492.2 |
| 5,831,181 | A | * | 11/1998 | Majumdar et al. | 73/863 |

* cited by examiner

*Primary Examiner*—Daniel S. Larkin
(74) *Attorney, Agent, or Firm*—Boyle Fredrickson Newholm Stein & Gratz S.C.

(57) ABSTRACT

A method and apparatus for manipulating the surface of a sample including a cantilever, a first tip mounted on the cantilever, and a second tip mounted on the cantilever, the first and the second tip being configured to combine to form an imaging probe and to separate to form a manipulation probe. The first and second tips are configured to form a first position characterized in that the tips combine to form an imaging tip and the first and the second tip are configured to form a second position characterized in that the tips separate to manipulate particles on a surface of a sample. The tips can be configured to form the first position when a voltage is applied across the tips, and preferable extend downwardly from the cantilever substantially perpendicular thereto.

30 Claims, 21 Drawing Sheets

FIG. 34

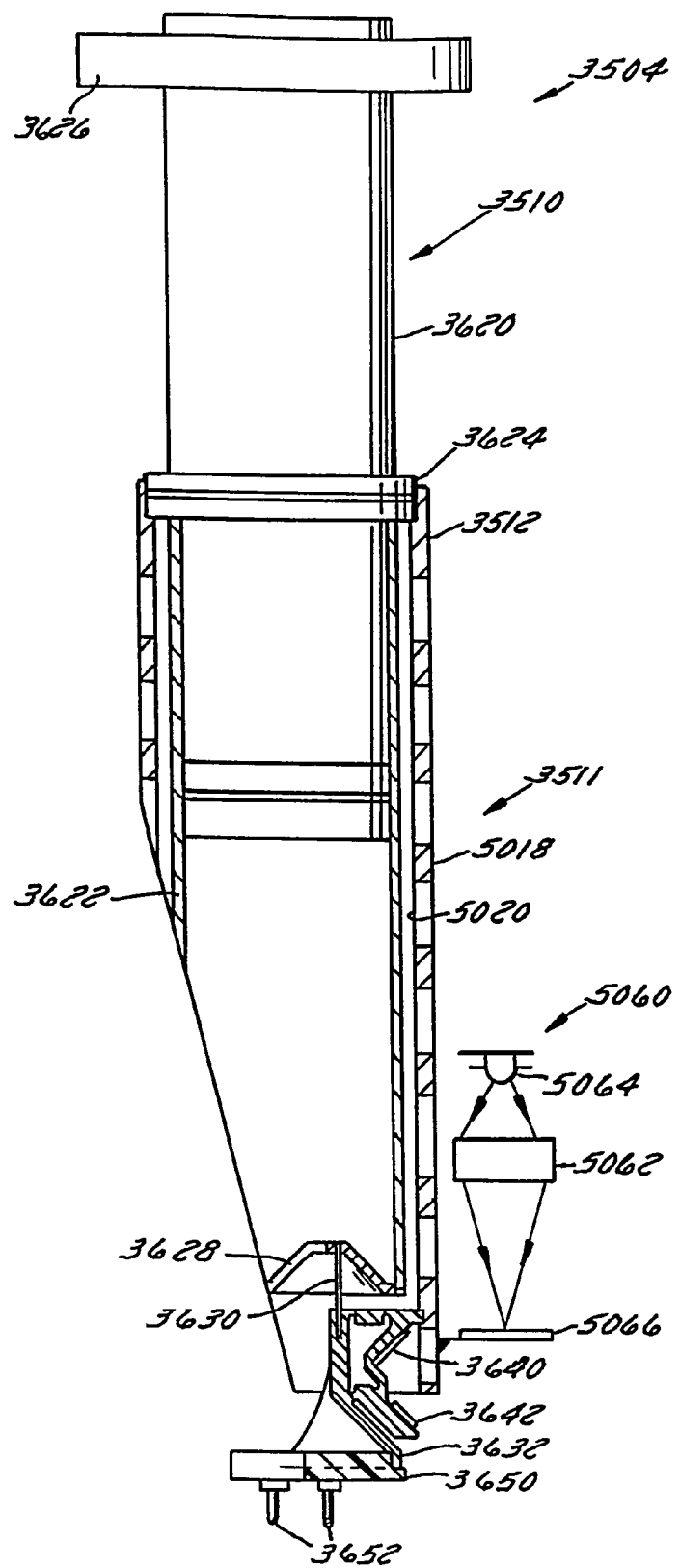
FIG. 36Ⅱ

METHOD AND APPARATUS FOR MANIPULATING A SAMPLE

This application is a divisional application of U.S. application Ser. No. 09/904,634, filed Jul. 13, 2001 now U.S. Pat. No. 6,862,921, titled Method and Apparatus for Manipulating a Sample, which is a continuation-in-part of U.S. application Ser. No. 09/855,960, filed May 15, 2001 now U.S. Pat. No. 6,530,268, titled Apparatus and Method for Isolating and Measuring Movement in Metrology Apparatus, which is a continuation-in-part of U.S. application Ser. No. 09/803,268, filed Mar. 9, 2001 now U.S. Pat. No. 6,612,160, each of which is incorporated by reference herein.

BACKGROUND OF THE INVENTION

1. Field of Invention

The present invention is directed to scanning probe microscopy. More particularly, the present invention is directed to a method and apparatus for characterizing and manipulating a sample.

2. Description of Related Art

Presently, scanning probe microscopes (SPMs) are typically used to determine the surface characteristics of a sample, commonly biological or semiconductor samples, to a high degree of accuracy, down to the Angstrom scale. An SPM operates by scanning a measuring probe assembly having a sharp stylus over a sample surface while measuring one or more properties of the surface. One example of an SPM is an atomic force microscope (AFM) wherein a measuring probe assembly includes a sharp stylus attached to a flexible cantilever. Commonly, an actuator such as a piezoelectric tube, often referred to as a piezo tube, is used to generate relative motion between the measuring probe and the sample surface. A piezoelectric tube moves in one or more directions when voltages are applied to electrodes disposed inside and outside the tube.

In the operation of an AFM, preferably, a measuring probe assembly is attached to a piezoelectric tube actuator so that the probe may be scanned over a sample fixed to a support. According to an alternative method, the probe assembly is held in place and the sample, which is coupled to a piezoelectric tube actuator, is scanned under it. In both AFM examples, the deflection of the cantilever is measured by reflecting a laser beam off the backside of the cantilever and towards a position sensitive detector.

In a contact mode or deflection mode of AFM operation, the AFM operates by placing the tip at the end of the cantilever of the probe directly on a sample surface so that the cantilever obtains a preset deflection. Preferably, the force between the tip and the sample surface is selected by the user, and defines an operating point of the AFM, the deflection setpoint. When scanning the surface laterally, the response of the cantilever to variations in the surface is monitored by an AFM deflection detection system and can be used to create an image of the sample surface. As suggested previously, a typical deflection detection system employed in AFM is an optical beam system that optically determines the deflection of the cantilever by light reflected off the cantilever onto a detector. Often, the height from the surface of the sample to a fixed end of the cantilever is adjusted with feedback signals that operate to maintain a predetermined amount of cantilever deflection (i.e., generally at the deflection setpoint) during scanning. A reference signal is often applied to one input of a feedback loop of an AFM system. The output of the feedback loop is then applied as an adjustment signal to an actuator to maintain constant cantilever reaction and maintain relative height. An image of the surface is then created by monitoring the feedback signals and plotting the adjustment amount versus lateral position of the cantilever tip.

In TappingMode™ (which is a trademark of Veeco Instruments, Inc.), a probe tip makes contact with a sample as it taps across the surface of the sample. An AFM employing TappingMode™ uses oscillation of a cantilever to reduce the forces on the sample. In particular, a specific cantilever is oscillated near or at its resonant frequency. A feedback loop is used to maintain a desired amplitude of oscillation. The feedback circuit adjusts a vertical position of the cantilever or the sample to maintain the desired amplitude as the cantilever traverses the surface of the sample. The signals used to adjust the vertical position are used to create an image of the surface versus the lateral position of the cantilever tip.

Unfortunately, present SPMs do not provide an adequate mechanism for manipulating the sample being imaged. For example, present SPMs do not adequately provide for accurately picking up, nudging, etc. the sample or portions thereof. Manipulation of the sample can be difficult because present SPMs do not allow for performing action on what often times are nanoscale objects. Present SPMs typically use the same probe to manipulate and image or they use one probe to manipulate and one probe to image but the design is such that there is a large horizontal distance between the manipulating and the imaging probes. This can create inaccuracies in determining the location of the manipulation probe with respect to an imaging probe because inaccuracies in offset determinations and inaccuracies in the precision of moving the probes. This offset can result in errors when attempting to manipulate the sample. Furthermore, present SPMs do not provide for adequate accuracy in manipulating particles on a sample due to limitations in the control accuracy of the actuator of the SPM. Another difficulty is that present SPMs encounter drift in the relative positions of the tip and sample, which can result in a probe manipulating an incorrect position on the sample. Therefore, an SPM that overcomes these drawbacks was desired.

SUMMARY OF THE INVENTION

The present invention provides a method and apparatus for manipulating the surface of a sample. In particular, the present invention overcomes the above mentioned drawbacks and provides additional benefits by providing probes that can perform both imaging and manipulating functions on a sample or can be controlled independently to image with one probe and manipulate with other probe without compromising accuracy. The function of the probes include imaging with one probe while the other probe is held above the sample surface which is used for manipulation. This mechanism protects the imaging probe from being contaminated during manipulation. Other manipulation functions include nanotweezing functions that are performed with a tip that can be opened and closed to pick up, move, and drop objects on a sample. The tip can also cut objects on a sample and provide electrostatic forces to a sample. The tip is perpendicular to a cantilever. Thus, the tip can be closed to perform imaging functions on the sample. Thus, the tip is extremely accurate because the imaging tip is the same tip as the manipulation tip.

According to one embodiment, the present invention provides a scanning probe microscope including a cantilever, a first tip mounted on the cantilever, and a second tip mounted on the cantilever, the first and the second tip being configured to combine to form an imaging tip and to separate to form a manipulation tip. The first and the second tip are configured to form a first position characterized in that the tips combine to form an imaging tip and the first and the second tip are configured to form a second position characterized in that the tips separate to manipulate particles on a surface of a sample. The tips can be configured to form the first position when a voltage is applied across the tips.

The scanning probe microscope can include a first electrode coupled to the first tip and a second electrode coupled to the second tip. The tips can be configured to form the first position when a voltage is applied across the first electrode and the second electrode. The cantilever can include a first cantilever portion, where the first tip is mounted on the first cantilever portion and a second cantilever portion, where the second tip is mounted on the second cantilever portion.

The scanning probe microscope can also include a first electrode coupled to the first cantilever portion and a second electrode coupled to the second cantilever portion. The tips can be configured to form the first position when a voltage is applied across the first electrode and the second electrode.

According to another embodiment, the present invention provides a scanning probe microscope including a cantilever having a longitudinal axis, a first tip mounted on the cantilever substantially perpendicular to the longitudinal axis, and a second tip mounted on the cantilever substantially perpendicular to the longitudinal axis. The cantilever can include a first cantilever portion, where the first tip is mounted on the first cantilever portion and a second cantilever portion, where the second tip is mounted on the second cantilever portion.

The scanning probe microscope can also include a first electrode coupled to the first cantilever portion and a second electrode coupled to the second cantilever portion. The tips can be configured to combine by applying a voltage across the first electrode and the second electrode. The tips can be configured to combine to scan a surface of a sample to create an image of the surface of the sample. The tips can further be configured to combine by applying a voltage across the first tip and the second tip. The tips can also be configured to combine by applying a voltage across the first cantilever portion and the second cantilever portion. The scanning probe microscope can additionally include a first electrode coupled to the first tip and a second electrode coupled to the second tip. The tips can be configured to combine by applying a voltage across the first electrode and the second electrode.

According to another embodiment, the present invention provides a nanomechanical tweezing apparatus including a cantilever having a first cantilever portion and a second cantilever portion, a first tip coupled to the first cantilever portion, a second tip coupled to the second cantilever portion, a first electrode coupled to the first cantilever portion, and a second electrode coupled to the second cantilever portion. The first cantilever portion and the second cantilever portion are configured so that the first tip and the second tip squeeze into contact when a sufficient voltage is applied across the first electrode and the second electrode. The first tip and the second tip are also configured to grip microscopic material. The first tip and the second tip are additionally configured to form a single imaging stylus when they are squeezed into contact. The first tip can be coupled substantially perpendicular to a longitudinal axis of the first cantilever portion and the second tip can be coupled substantially perpendicular to a longitudinal axis of the second cantilever portion.

According to another embodiment, the present invention provides method for interacting with a surface of a sample and switching between imaging modes by including the following process: Turning off the feedback of the probe, lifting the probe from the surface, storing a change in deflection or amplitude between a deflection or amplitude setpoint and a free air deflection or amplitude, and turning on the feedback. The method can also include switching between TappingMode™ and contact mode or the reverse by turning off feedback of the probe, setting a deflection setpoint based on a free air deflection or amplitude combined with the change in deflection or amplitude, changing the input to the feedback loop and turning on the feedback. The method can include manipulating the surface with the probe. The probe can include a cantilever, a first tip mounted on the cantilever, and a second tip mounted on the cantilever, the first and the second tip being configured to combine to form an imaging tip. The method can also include applying a voltage across the first tip and the second tip to combine the first tip and the second tip to form an imaging tip. The method can also include applying a voltage across the first tip and the second tip to combine the first tip and the second tip to form an imaging tip.

According to another embodiment, the present invention provides method for operating a probe that interacts with a surface of a sample including scanning a region the surface of the sample with the probe, manipulating the surface of the sample with the probe, and rescanning a subregion of the region of the surface of the sample. The manipulating step can further include manipulating the surface of the sample with a probe other than the probe used to scan the region of the surface of the sample. The manipulating step can also include manipulating the surface of the sample with the probe used to scan the region of the surface of the sample. The manipulating step can additionally include manipulating a subregion of the region of the surface of the sample with the probe, and the rescanning step can include rescanning the manipulated subregion of the region of the surface of the sample.

The manipulating step can include manipulating particles on the surface of the sample with the probe. The manipulating step can include manipulating particles on the surface of the sample by picking up the particles with the probe. The probe can include a cantilever, a first tip mounted on the cantilever, and a second tip mounted on the cantilever, the first and the second tip being configured to combine to form an imaging tip. The method can also include applying a voltage across the first tip and the second tip to combine the first tip and the second tip to form an imaging tip.

According to another embodiment, the present invention provides a method for interacting with a surface of a sample including scanning the surface of the sample with a probe to create a first image, scanning the surface of the sample with a probe to create a second image, and determining a relative position of the probe by comparing the first image to the second image. The method can include continuously adjusting a position of the probe based on a result obtained from the determining step for subsequent manipulation and imaging steps.

The probe can include a cantilever, a first tip mounted on the cantilever, and a second tip mounted on the cantilever, the first and the second tip being configured to combine to form an imaging tip. The method can include applying a voltage across the first tip and the second tip to combine the first tip and the second tip to form an imaging tip.

According to another embodiment, the present invention provides a method for interacting with a surface of a sample, including scanning the surface of the sample with a probe to create an image, performing pattern recognition on the image to obtain a pattern recognized image, and automatically manipulating the surface of the sample with the probe based on the pattern recognized image. The probe can include a cantilever, a first tip mounted on the cantilever, and a second tip mounted on the cantilever, the first and the second tip being configured to combine to form an imaging tip. The method can include applying a voltage across the first tip and the second tip to combine the first tip and the second tip to form an imaging tip.

According to another embodiment, the present invention provides a method of making a nanomechanical tweezing apparatus including forming a probe having a tip coupled to a cantilever, the probe having a longitudinal axis, and performing milling along a longitudinal axis of the probe to separate the probe into a first cantilever including a first tip and a second cantilever including a second tip. The performing step can perform focused ion beam milling along the longitudinal axis of the probe to separate the probe into a first cantilever including a first tip and a second cantilever including a second tip. The method can include coupling a first electrode to the first cantilever portion, and coupling a second electrode to the second cantilever portion. The probe can include a combination of silicon and silicon dioxide. The method can also include performing metal deposition on a surface of the probe.

According to another embodiment, the present invention provides a method of making a probe for a scanning probe microscope including forming a first cantilever portion, forming a second cantilever portion substantially parallel to the first cantilever portion, forming a first tip portion on the first cantilever portion substantially perpendicular to the first cantilever portion, and forming a second tip portion on the second cantilever portion substantially perpendicular to the second cantilever portion. The method can include coupling a first electrode to the first cantilever portion, and coupling a second electrode to the second cantilever portion. The method can also include forming a layer of insulation on the cantilever portion and forming a layer of a conductive material on a surface of the cantilever portion. The cantilever can include silicon, the layer of insulation can include silicon oxide or silicon dioxide, and the layer of conductive material can include metal.

According to another embodiment, the present invention provides a method of making a probe for a scanning probe microscope including forming a probe that contains a U-shaped cantilever with a tip integrated on each of the arms. The arms contain a layer that actuates the desired tip to engage the surface while the other tip remains above the surface. The actuation layer can include a piezoelectric material such as ZnO or a thermal resistance layer formed out of polycrystalline silicon or implanted silicon layers. The actuation process can be achieved by applying a potential to the piezoelectric material or by heating the thermal element. The actuated arm will shape in the form of bow making the tip touch the surface while other tip remains above the surface. This mechanism will facilitate the imaging and manipulation of samples with different tips.

According to another embodiment, the present invention provides a method of making a probe for a scanning probe microscope including forming two cantilevers with integrated tips at the free ends of them and separated from each other vertically when the probe is mounted in the apparatus. The cantilevers are separated with an insulator layer and have a metal layer coated on both the cantilevers. The cantilevers can be made out of silicon as well as that of silicon dioxide. The cantilevers can be made to move towards or away from each other by applying a suitable electrostatic force. This movement of the cantilevers in a vertical plane facilitates use of one probe for imaging and the other for carrying out another function such as manipulation.

U.S. application Ser. No. 09/855,960, filed May 15, 2001, discloses an Apparatus and Method for Isolating and Measuring Movement in Metrology Apparatus and is incorporated by reference in its entirety. In particular, according to another embodiment, the present application provides an assembly including an actuator with a longitudinal axis having a fixed end, and a free end configured to translate in at least one direction with respect to the fixed end, a multiple bar linkage having first and second links mutually constrained to translate with respect to each other, and wherein the first link is fixed to a reference structure and the second link is constrained to translate in a direction generally parallel to the longitudinal axis of the actuator, a coupling having first and second ends, the first end being fixed to the actuator proximate to its free end, and the second end being fixed to the second link, the coupling adapted to transmit displacement in a direction substantially parallel to the longitudinal axis of the actuator, an objective fixed to the reference structure, wherein the objective is between a light source and a position sensor, and the position sensor measures displacement of the objective in at least one direction generally perpendicular to the longitudinal axis of the actuator, and a probe coupled to the actuator, wherein the probe is configured to manipulate the surface of a sample.

The light source and the position sensor can be stationary. The objective can include a set of microlenses. The set of microlenses can provide optical magnification to increase a signal-to-noise ratio. The magnification can be $M=1+i/o$ where i is an orthogonal distance from the principal plane of the set of microlenses to the position sensor and o is an orthogonal distance from the principal plane of the set of microlenses to the light source. Movement of a beam of electromagnetic radiation from the light source directed to the position sensor through the set of microlenses can be multiplied by a factor of M. The assembly can be a scanning probe microscope. Also, the actuator can be a piezoelectric or electrostrictive actuator. The probe can include a cantilever, a first tip mounted on the cantilever, and a second tip mounted on the cantilever, the first and the second tip being configured to combine to form an imaging tip. A voltage can be applied across the first tip and the second tip to combine the first tip and the second tip to form an imaging tip.

Accordingly, the present invention provides for the accurate manipulation of particles, objects, surfaces, and the like on a sample. Also, the present invention can accurately pick up, move, and deposit particles on the sample. In particular, the present invention can act as a nanomechanical tweezers that provides for manipulating the surface and other similar aspects of a sample. The present invention also allows manipulation of a sample with one probe and imaging with another probe, both attached to the same substrate.

BRIEF DESCRIPTION OF THE DRAWINGS

The preferred embodiments of the present invention will be described with reference to the following figures, wherein like numerals designate like elements, and wherein:

FIG. 34 is an exemplary illustration of a user interface for use with the probe according to one embodiment;

FIG. 36B is a side elevation cross-sectional view of the piezoelectric actuator assembly including an optical measuring apparatus according to a preferred embodiment of the present invention;

FIG. 36C–36D are exemplary illustrations of alternate embodiments of the optical measuring apparatus shown in FIG. 36B;

DETAILED DESCRIPTION OF PREFERRED EMBODIMENTS

Figure 1:
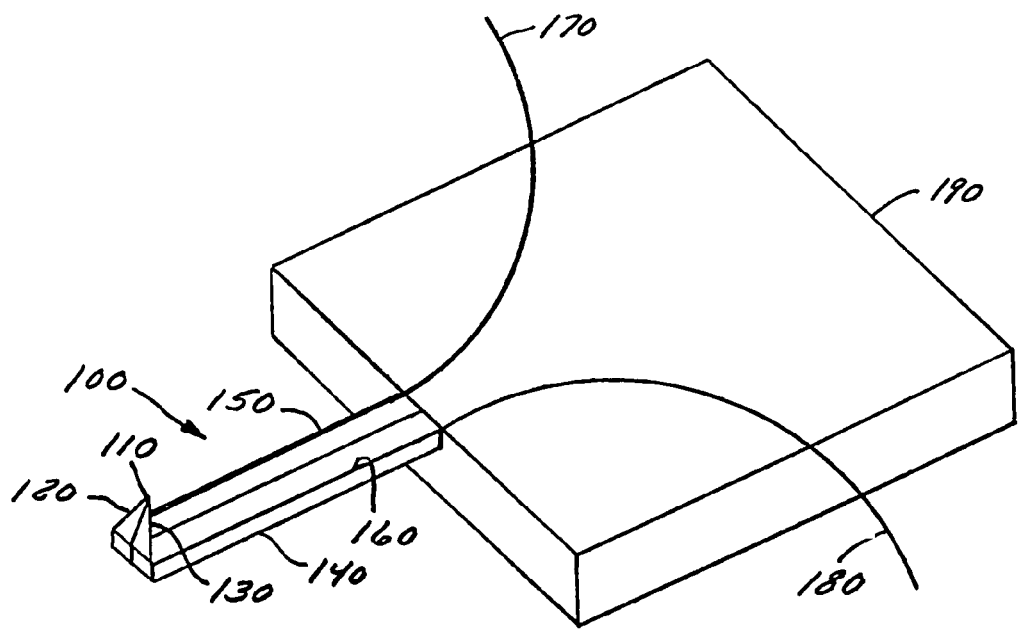
FIG. 1 is an exemplary illustration of a probe according to one preferred embodiment.

FIG. 1 is an exemplary illustration of a probe 100 particularly adapted for both imaging and manipulating samples, such as biological samples, (e.g., DNA) according to one embodiment. The probe 100 can include a cantilever 140 and a tip or tweezers 110 mounted substantially perpendicular to the cantilever 140. The tip 110 can include a first tip or prong 120 and a second tip or prong 130 mounted substantially perpendicular to the cantilever. The cantilever 140 can be mounted to a base 190 and can have a longitudinal axis running from the end of the cantilever mounted to the base to the opposite, free end of the cantilever. Preferably, the tips 120 and 130 can be mounted substantially perpendicular to the longitudinal axis of the cantilever. The cantilever 140 can include a first cantilever portion 150, and a second cantilever portion 160 disposed generally parallel thereto. A first electrode 170 and a second electrode 180 can be coupled to the tips 120 and 130 or the cantilevers 150 and 160.

In operation, the probe 100 can be used to image, measure, and/or manipulate a sample. In particular, an electrical potential can be applied to the first and second electrodes 170, 180, respectively, to combine the tips 120 and 130 so that together they simulate a tip of a conventional scanning probe microscope to obtain an image or measurement of the surface of the sample using known microscopy techniques. Additionally, the tips can be combined using techniques such as thermal actuation, actuation using piezoelectric elements, or any other technique useful for adjusting the position of a probe. For example, the probe can include a layer of aluminum, platinum, alloy, isopolysilicon, boron, or the like. The electric potential can be opposite polarities between the tips, like polarities between the tips, one voltage and one ground potential applied to each tip, or any useful potential for combining or separating the tips. These tip operation techniques can be applied to the tips and probes of all of the disclosed embodiments.

When together, tips 120, 130 can be used for nanomanipulation of sample particles, such as "nudging" them, etc. Additionally, the tips 120 and 130 can be opened and closed by applying appropriate voltages to the first electrode 170 and the second electrode 180 to act as a nanomechanical tweezers. For example, a zero voltage can be applied to open the tip 110 and non-zero voltage can be applied to close the tip 110. Thus, the tip 110 can then be used to pick up particles, replace particles, place particles, move particles, remove particles, apply voltages, and perform other manipulations on a sample. The tip 110 can further be used for dip pen or other lithography. For example, the tip 110 can be used to remove or alter material in a thin layer or in a homogeneous layer of a sample. Furthermore, the tips 120 and 130 can be separated and positioned on a such that both tips are in contact with the sample. Then both tips 120 and 130 can be used to measure local conductivity or other electrical properties on the surface of the sample or of the feature manipulated. Furthermore, additional tips may be employed to facilitate, for example, a robotic hand, an array of probes, or the like. All of these techniques can be applied to the probes disclosed in all of the embodiments.

In this regard, the probe 100 can be used to manipulate or cut DNA or other particles. The probe 100 can further be used to manipulate particles across the surface of a sample to create different structures on the sample. For example, the probe 100 can be used to manipulate conductive particles to create structures with specific electrical properties. The probe 100 can also be used for lithography by dipping into and placing fluid with specific photolithographic properties on a sample. The probe 100 can additionally be used to study electrical parameters. For example, the tips 120 and 130 can be opened a specific distance and a voltage can be applied across the tips. Additionally, a second probe (e.g., a conventional AFM probe) can be used to perform imaging of a sample, while the probe 100 can be used to manipulate the sample. For example, the second probe can be placed a few microns from the probe 100 to perform imaging of a sample while the probe 100 manipulates the sample. An offset can be applied to accurately account for the displacement between the two probes. Also, one probe can raise or lower relative to the other probe to alternate image and manipulate the sample.

Force feedback can be used to inform an operator of when the probe 100 encounters particles or irregularities in the surface of the sample. For example, such feedback can be used to cause the operator to feel physical resistance on an input device such as a joystick when the probe 100 encounters a particle on the surface of the sample.

Also, the probe 100 can be used with any mode of scan probe imaging including contact atomic force microscopy (AFM), non-contact AFM, lateral force microscopy (LFM), scanning tunneling microscopy (STM), magnetic force microscopy (MFM), scanning capacitance microscopy (SCM), force modulation microscopy (FMM), phase imaging, electrostatic force microscopy (EFM), and other modes of operating a scanning probe microscope. For example, lateral force microscopy (LFM) could be used to image the sample by monitoring the torsional response of the probe and, as with AFM, using that data to locate the regions of interest for later manipulation.

Figure 2:
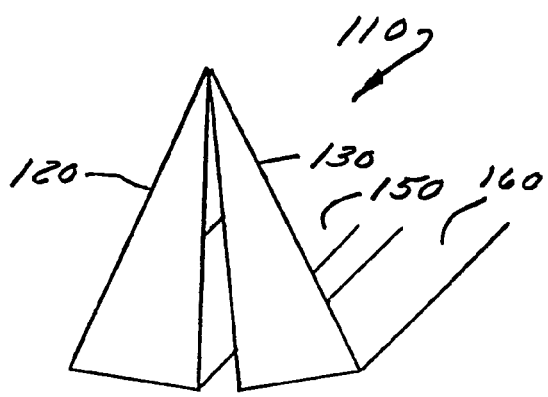
FIG. 2 is an exemplary illustration of the first tip and the second tip of the tip of the probe in a first position according to one embodiment.

FIG. 2 is an exemplary illustration of the first tip 120 and the second tip 130 of the tip 110 of the probe 100 in a first position according to one embodiment. To achieve the first position, for example, a voltage is applied across the electrodes 170 and 180. Thus, the first tip 120 and the second tip 130 combine to form an imaging tip. Therefore, the tip 110 can be used to obtain an image of a surface of a sample. This image of the surface of a sample can include properties such as the physical characteristics of the sample, the electrical characteristics of the sample, electromagnetic characteristics of the sample, characteristics below the surface of the sample, or any other characteristic of the sample.

Figure 3:
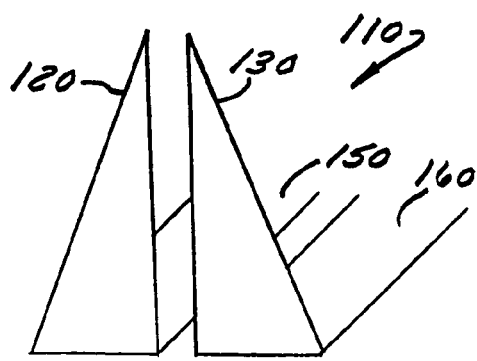
FIG. 3 is an exemplary illustration of the first tip and the second tip of the tip of the probe in a second position according to one embodiment.

FIG. 3 is an exemplary illustration of the first tip 120 and the second tip 130 of the tip 110 of the probe 100 in a second position according to one embodiment. To achieve the second position, for example, a ground voltage is applied across the electrodes 170 and 180. Thus, the first tip 120 and the second tip 130 are configured to form a tweezers tip 110 capable of manipulating particles on a surface of a sample. In operation, a suitable voltage is applied across the electrodes 170 and 180 to open and close the tweezers tip 110 to manipulate particles on a surface of a sample as described above.

Figure 4:
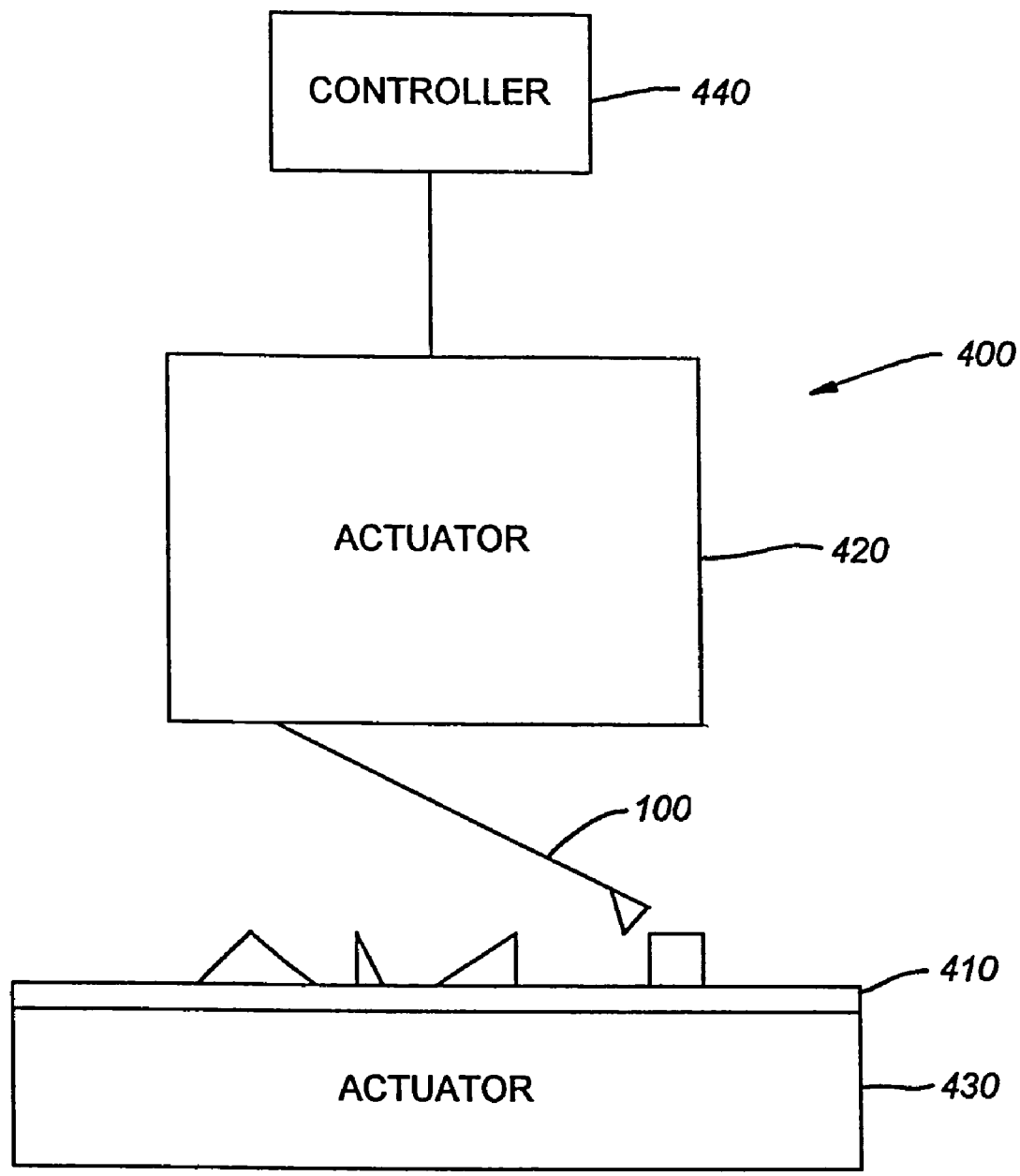
FIG. 4 is an exemplary illustration of a system for scanning the surface of a sample according to one embodiment.

FIG. 4 is an exemplary illustration of a system 400 for scanning the surface of a sample 410 according to one embodiment. The system 400 includes the probe 100, a sample 410, a probe mount or actuator 420, a sample mount or actuator 430, and a controller 440. In operation, the probe 100 is scanned across the surface of the sample 410. This scanning is performed either by moving the probe 100 relative to the sample 410, the sample 410 relative to the probe 100, or a combination of each relative to each other. This scanning is performed by applying voltages to the actuators 420 and 430, or by other techniques of adjusting the position of the probe 100 and the sample 410. When in a first position, the probe 100 can obtain an image of the surface of the sample 410 including different characteristics of the sample 410, or it can be used to manipulate the sample. Again, when in a second position, or when toggling between the first and second position, the probe 100 can manipulate the surface of the sample 410. The controller 440 controls operation of the system 400 and probe 100. The system 400 can operate in any mode of scan probe imaging as described above.

Figure 5:
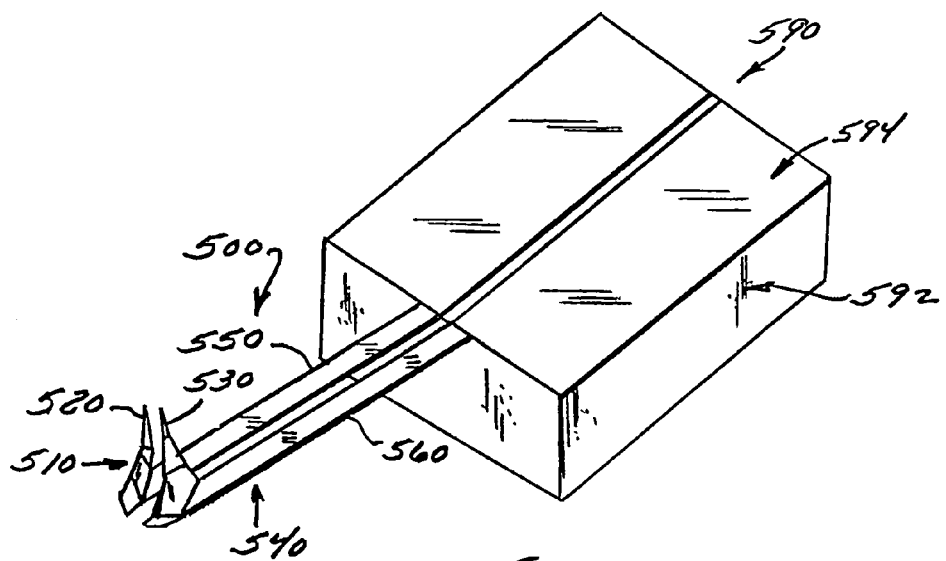
FIG. 5 is an exemplary illustration of a probe according to another embodiment.

FIG. 5 is an exemplary illustration of a probe or nanotweezer 500 according to another embodiment. The probe 500 is similar to the probe 100 and has similar characteristics which are interchangeable with those described above. In particular, the probe 500 can include a single cantilever 540 and a tip or tweezers 510 mounted substantially perpendicular to the cantilever 540. The tip 510 can include a first prong 520 and a second prong 530 mounted substantially perpendicular to the cantilever. The cantilever 540 can be mounted to a base or silicon block 590. Moreover, the cantilever 540 can include a first cantilever portion 550 and a second cantilever portion 560. The base 590 can include a silicon portion 592 integral with the cantilever and may also include a conductive or metal layer 594. The metal layer 594 can be used to apply electrostatic force to actuate the prongs. The probe 500 and the base 590 can be microfabricated in a batch process using silicon micromachining technology discussed below.

In operation, the probe 500 can be used to image and manipulate a sample. In particular, an electrical potential can be applied to portions of the metal layer 594 or the cantilever 540 to combine the prongs 520 and 530 to obtain an image of the surface of a sample. Additionally, the prongs 520 and 530 can be opened and closed by applying appropriate voltages to the metal layer or to the cantilever 540 to act as a nanomechanical tweezers. For example, a zero voltage can be applied to open the tip 510 and non-zero voltage can be applied to close the tip 510. Thus, the tip 510 can then be used to pick up particles, replace particles, place particles, move particles, remove particles, apply voltages, and perform other manipulations on a sample.

Figure 6:
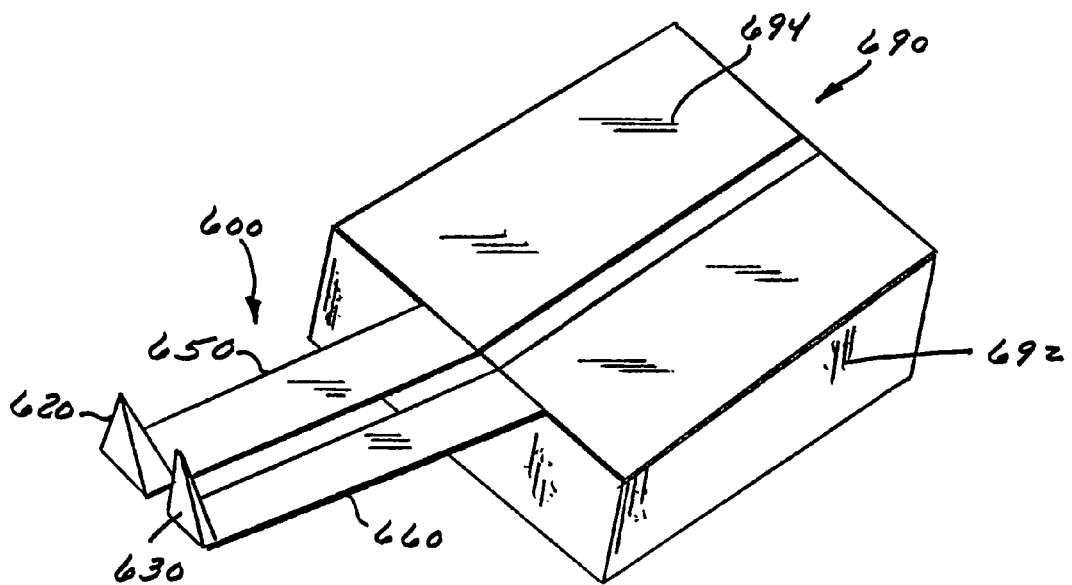
FIG. 6 is an exemplary illustration of a probe according to another embodiment.

FIG. 6 is an exemplary illustration of a probe 600 according to another embodiment. The probe 600 is similar to the probes 100 and 500 and has similar characteristics which are interchangeable with those described above. In particular, the probe 600 can include a first cantilever portion 650, a second cantilever portion 660, and a first tip 620 and a second tip 630 mounted substantially perpendicular to the cantilever portions 650 and 660. The cantilever portions 650 and 660 can be mounted to a base 690. The base 690 can include a silicon portion 692 and a conductive or metal layer 694.

In operation, the probe 600 can be used to image and manipulate a sample. In particular, an electrical potential can be applied to portions of the metal layer 694 or the cantilever portions 650 and 660 to combine the tips 620 and 630 to obtain an image of the surface of a sample. Additionally, the tips 620 and 630 can be opened and closed by applying appropriate voltages to the metal layer or to the cantilever portions 650 and 660 to act as a nanomechanical tweezers. For example, a zero voltage can be applied to open the tips 620 and 630 and non-zero voltage can be applied to close the tips 620 and 630. Thus, the tips 620 and 630 can then be used to pick up particles, replace particles, place particles, move particles, remove particles, apply voltages, and perform other manipulations on a sample.

FIGS. 7–20 are exemplary illustrations of a process for manufacturing a probe according to one embodiment. For example, the process illustrated in FIGS. 7–20 can be implemented in a batch fabrication process to manufacture many probes such as the probe 500 illustrated in FIG. 5. The figures are not necessarily to scale with respect to each other.

Figure 7:
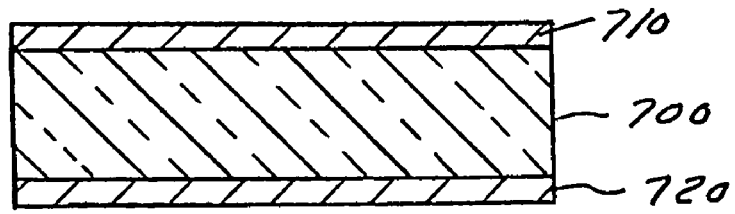
FIGS. 7–20 are exemplary illustrations of a process for manufacturing a probe according to one embodiment.
Figure 8:
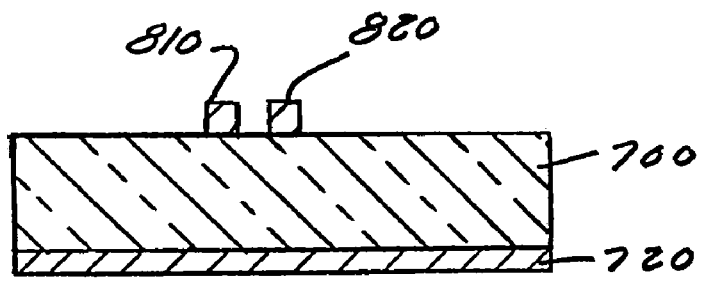
Figure 9:
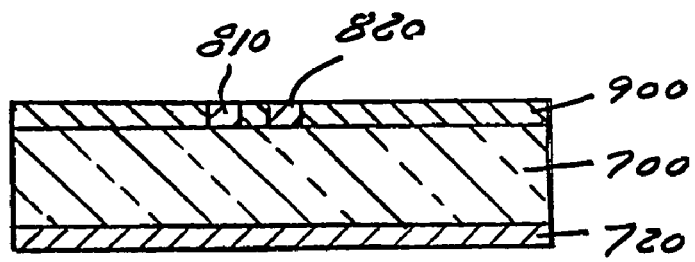

FIGS. 7–9 are exemplary illustrations of a cross-sectional view of a silicon wafer 700. FIG. 7 illustrates the silicon wafer 700 having a first side of silicon nitride ($Si_3N_4$) 710 and a second side of silicon nitride 720. A photoresist pattern (not shown) can be created using standard lithography process (photoresist coating, pre-baking, mask exposure, post baking and developing). The photoresist pattern is used as a mask to etch the uncovered silicon nitride in reactive plasma. The photoresist is then stripped away. The resulting structure containing two posts of silicon nitride 810 and 820 is shown in FIG. 8.

Figure 10:
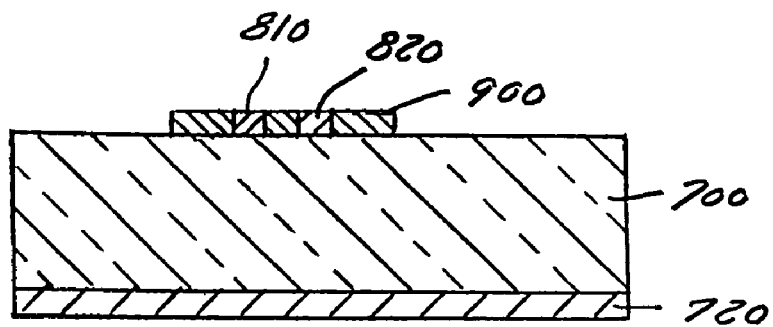
Figure 11:
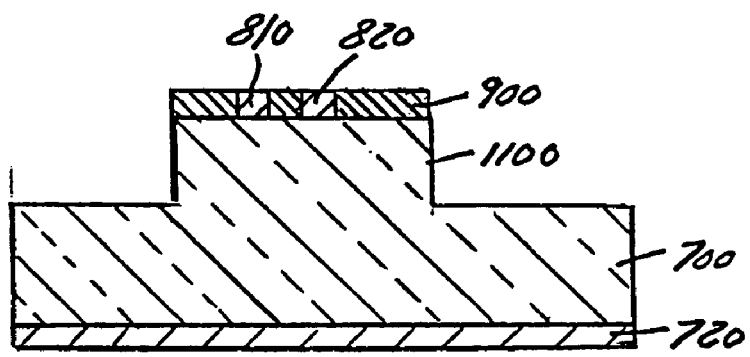
Figure 12:
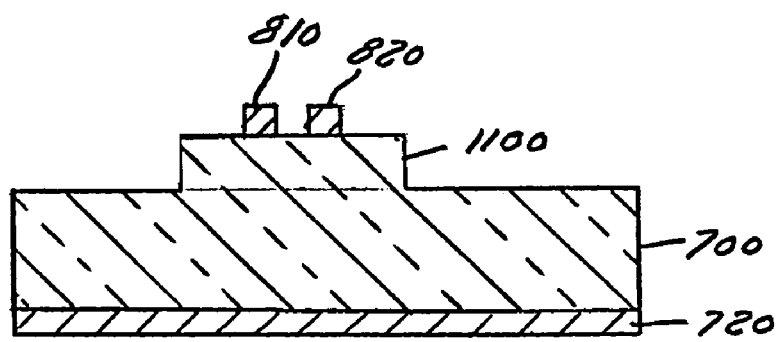
Figure 13:
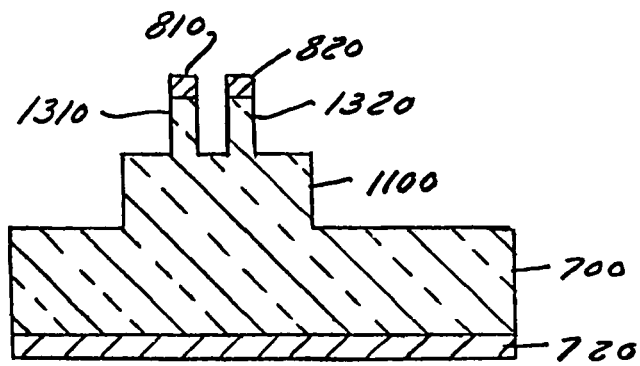

FIG. 9 illustrates silicon dioxide 900 thermally grown on a surface of the silicon 700 by using thermal oxidation of silicon process. Alternatively, the oxide can be deposited using a technique such as Chemical Vapor Deposition. FIGS. 10 and 11 illustrate the formation of a post 1100 by lithography and silicon etching with a reactive plasma using $SiO_2$ as a mask. FIGS. 12 and 13 illustrate the formation of prongs 1310 and 1320 on the top of the post 1100 by lithography and etching the silicon in reactive plasma using nitride as a mask. As shown in FIG. 12, the silicon dioxide is removed prior to the formation of the prongs 1310 and 1320.

Figure 14:
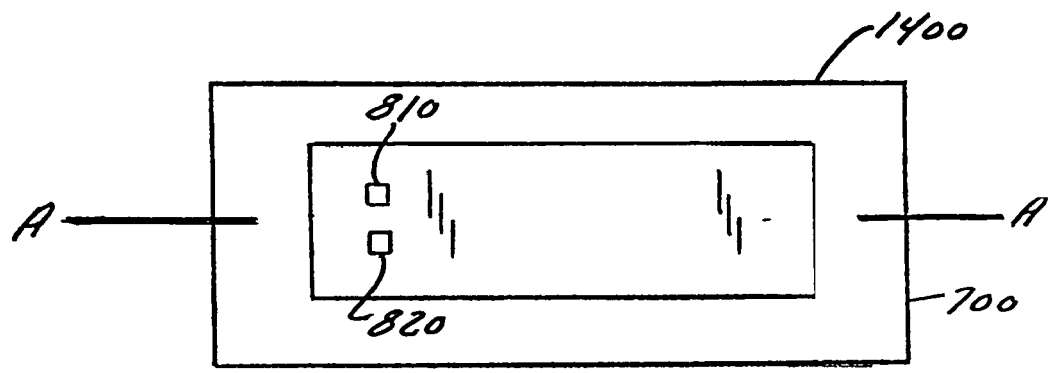
Figure 15:
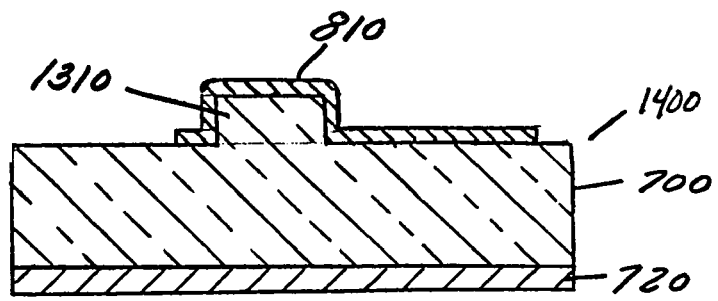

FIG. 14 is an illustration of plan view of a cantilever 1400 resulting from the above technique defined by lithography and subsequent etching of the silicon nitride. The photoresist used can be very thick to protect the prongs 1310 and 1320 and the posts 810 and 820 and to keep them integrated with the cantilever. The cantilever 1400 includes integrated prongs 1310 and 1320 from the above technique. FIG. 15 is an illustration of a cross-sectional view of the cantilever 1400 along line A—A of FIG. 14.

Figure 16:
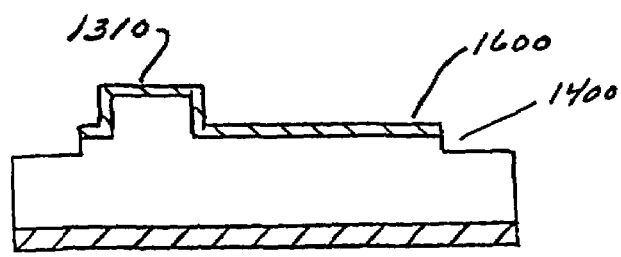

FIG. 16 is an illustration of a silicon post 1600 used for additional formation of the cantilever 1400. The wafer is then deposited with silicon nitride for carrying out deep etching. A photoresist pattern is defined on the backside of the wafer. The pattern is aligned with respect to the cantilever on the front side. The nitride is then etched with reactive plasma from the backside using photoresist as the mask. The photoresist is then stripped and wafer is cleaned. The wafer is then placed in an anisotropic silicon etchant solution such as KOH. The silicon nitride on the front side protects the structures from the KOH. The anisotropic etchant preferentially etches all crystal planes of the silicon except the (111) plane. The etch rate of the (111) crystal plane is preferably very small.

Figure 17:
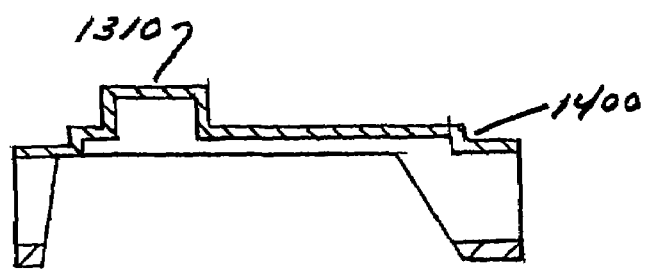
Figure 18:
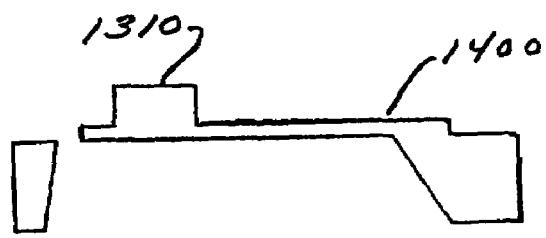
Figure 19:
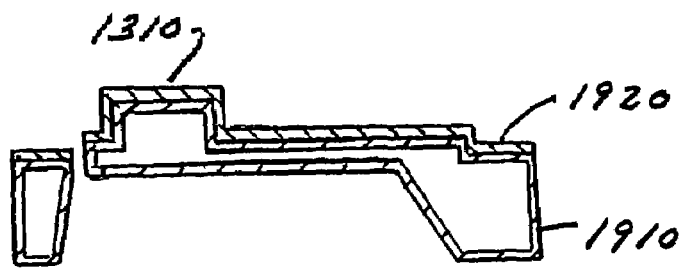
Figure 20:
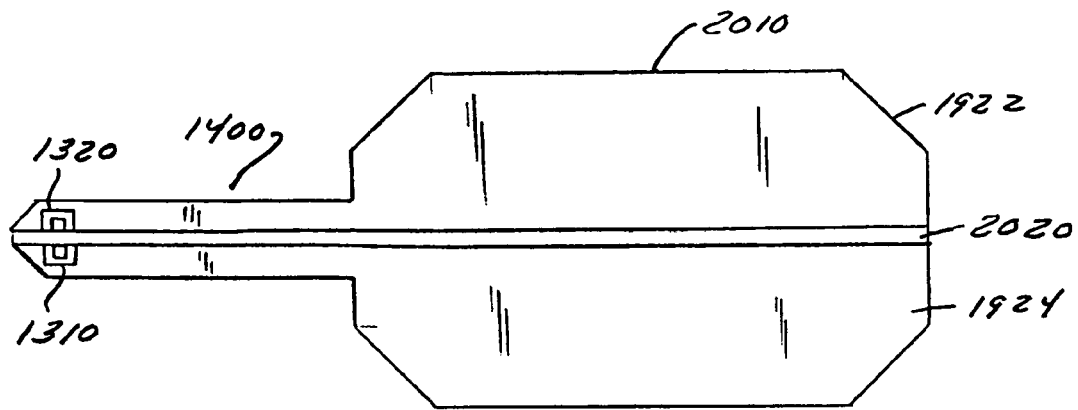

FIG. 17 illustrates the structure when the etching is complete. FIG. 18 illustrates the resulting structure after the silicon nitride layer is preferably chemically etched. Thus, FIG. 18 illustrates a released cantilever 1400 with the integrated tips 1310 and 1320 (not shown). FIG. 19 is an illustration of a cross-sectional view of the cantilever with a layer of insulating material 1910 and a layer of conductive material 1920. The insulating material 1910 can be silicon dioxide, or the like and the conductive material 1920 can be metal, or the like. FIG. 20 is an illustration of a plan view of the cantilever 1400 extending from a base 2010. Metal lines 1922 and 1924 are isolated from each other by creating a gap 2020 using focused ion beam milling. The milling electrically separates the tips 1310 and 1320 and creates contact pads 1922 and 1924 on the substrate for supplying an electrostatic force for operating the tips 1310 and 1320. Thus, the above process creates a probe such as probe 500.

Many of the individual steps in the process described above can be altered without affecting the utility of the final structure. For example one can use silicon-on-insulator wafer instead of single crystal silicon wafer to have an etch stop and tighter control on the thickness of the cantilever. The cantilever can be made from silicon dioxide or silicon nitride. The length and thickness of the cantilever and the prongs can be varied. The process described above can be used for batch fabrication of several hundred probes on a single silicon wafer.

Figure 21:
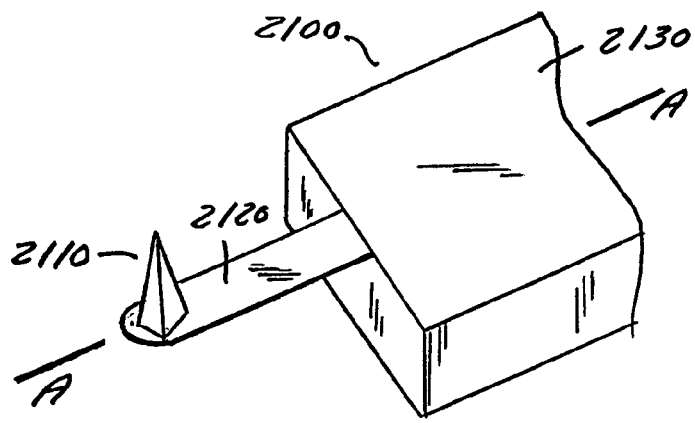
FIGS. 21–22 are exemplary illustrations of a probe system for implementation of a focused ion beam milling technique for manufacturing the probe according to one embodiment.
Figure 22:
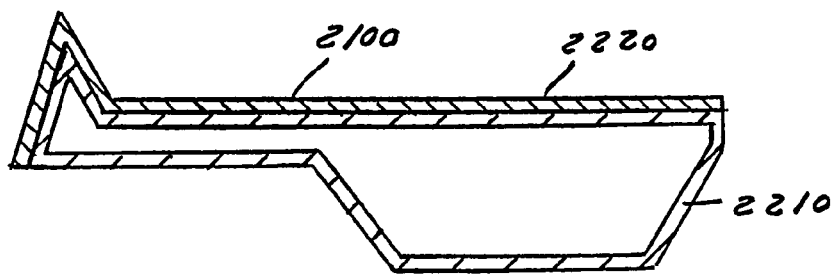

FIGS. 21–22 are exemplary illustrations of a probe system for implementation of a focused ion beam milling technique for manufacturing a probe such as probe 100 according to another embodiment. FIG. 21 is an exemplary illustration of an existing probe 2100 that can be used in this technique. The existing probe 2100 includes a tip 2110 and a cantilever 2120 extending from a silicon base 2120. The probe is thermally oxidized. This step covers the entire probe with a silicon dioxide layer. The tip side is then coated with a metal layer. FIG. 22 is an illustration of a cross-sectional view along line A—A of the probe 2100 illustrated in FIG. 21. As illustrated in FIG. 22, an insulating layer 2210 such as silicon dioxide is thermally grown or deposited on the probe 2100 using oxidation techniques. Then, a conductive layer 2220, such as metal is deposited over the oxidation layer 2210. The tip 2110 can be milled to form prongs. The probe 2100 can then be milled along the center of its length to electrically isolate the prongs. The milling can also be performed into the silicon substrate 2130 to create pads for the application of voltages across the prongs. The resulting probe such as the probe 100 or the probe 500 is illustrated in FIGS. 1 or 5 respectively.

FIGS. 23–33 are exemplary illustrations of a process for manufacturing or microfabricating probe or nanotweezer 600 illustrated in FIG. 6 according to another embodiment. The probe 600 includes the two cantilevers 650 and 660 which can be moved laterally with the application of an electrostatic force. Each tip 620 and 630 is triangularly shaped with a flat surface facing the other tip. Thus, the tips can close completely to grab tiny structures on or in a sample.

Figure 23:
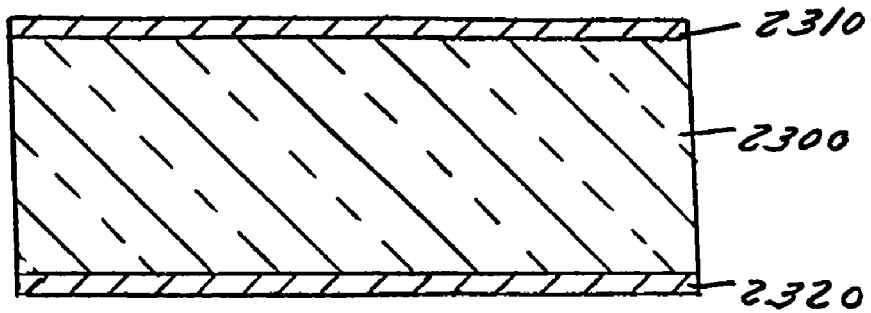
FIGS. 23–33 are exemplary illustrations of a process for manufacturing a probe according to one embodiment.
Figure 24:
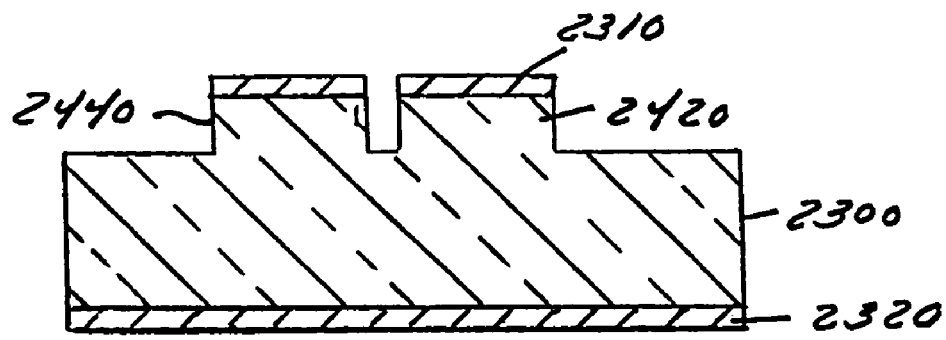
Figure 25:
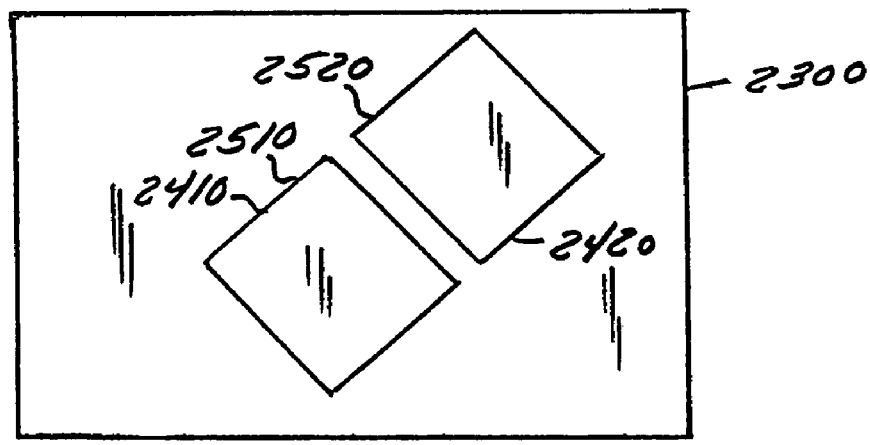
Figure 26:
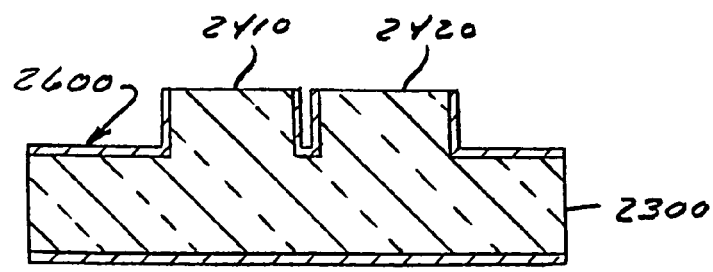

FIG. 23 is an exemplary illustration of a cross-sectional view of a silicon wafer 2300 having silicon nitride ($Si_3N_4$) 2310 and 2320 on both sides. A photoresist pattern (not shown) is created on one side of the wafer. The resist pattern is used as a mask to allow the surrounding $Si_3N_4$ and silicon to be etched in a reactive plasma. FIG. 24 is an illustration of the formation of two silicon posts 2410 and 2420 on the silicon wafer 2300 from the plasma etch. FIG. 25 is an illustration of a plan view of the silicon posts 2410 and 2420 on the silicon wafer 2300. Sharp corners 2510 and 2520 define the location of the desired tips, such as tips 120 and 130. FIG. 26 is an illustration of a cross sectional view of the silicon posts 2410 and 2420 and the silicon wafer 2300 with silicon dioxide ($SiO_2$) grown on the surfaces without the silicon nitride 2130 and the silicon nitride 2130 removed. In particular, the $SiO_2$ covers the entire surface of the wafer except for the top of the posts 2410 and 2420 where the presence of the $Si_3N_4$ prevents the growth of $SiO_2$. The $Si_3N_4$ is then selectively removed in a reactive plasma.

Figure 27:
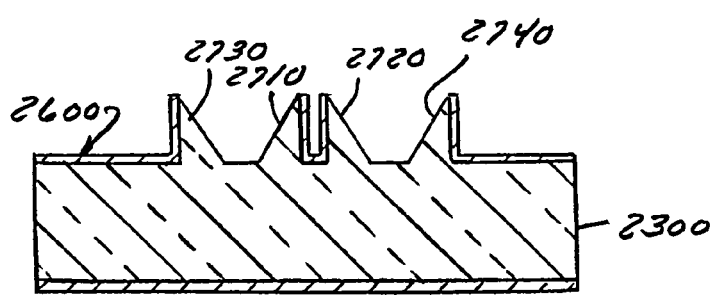
Figure 28:
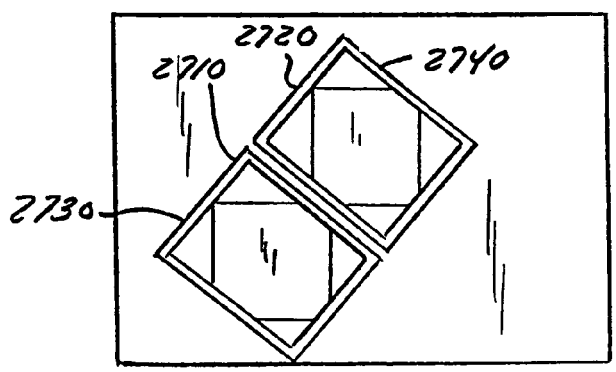

FIG. 27 illustrates the wafer 2300 after it has been placed in an anisotropic silicon etchant such as KOH solution. Silicon is etched away from the top of the new posts 2710–2740, but is not etched where the $SiO_2$ masks the silicon on the post sidewalls and the rest of the wafer 2300 surface. Thus, the final profile of the etched out posts 2710–2740 consist of triangular shaped features resting against the $SiO_2$ sidewalls at the corners of the posts 2710–2740. The length of the KOH etch is timed to produce the desired tip height. FIG. 28 is an illustration of a plan view of the remains of the etched-away posts 2710–2740. Thus, when the $SiO_2$ is subsequently removed, sharp tips, including tips 2710–2740, remain, pointing up substantially perpendicular from the surface of the wafer. At this step, multiple tips are formed whenever there are corners on the original post pattern.

Figure 29:
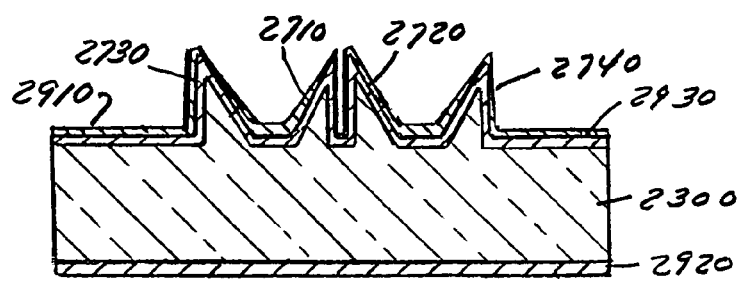
Figure 30:
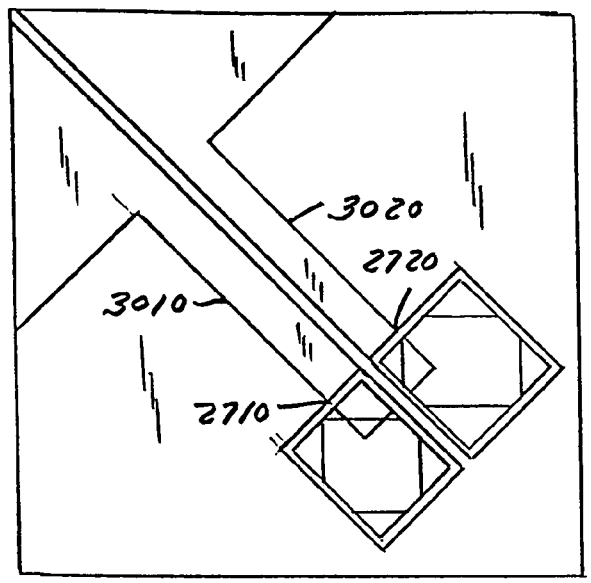
Figure 31:
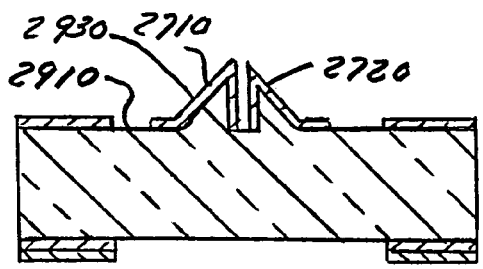
Figure 32:
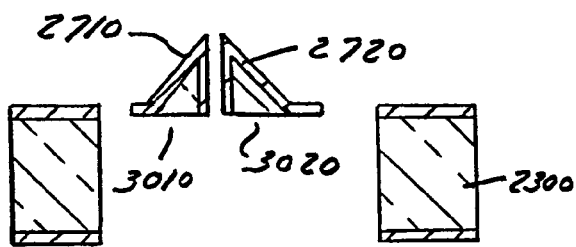
Figure 33:
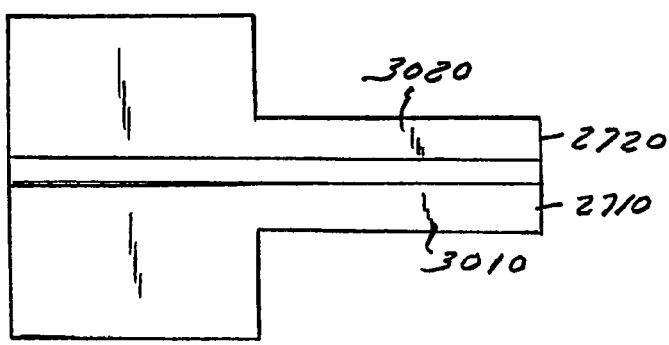

FIG. 29 is a cross-sectional view of the silicon wafer 2300 showing an insulator 2910 and 2920, such as silicon dioxide or the like, placed on both sides of the silicon wafer 2300. A conductive layer 2930, such as a metal layer or the like, is then placed on the top side of the silicon wafer 2300. FIG. 30 is an illustration of a pair of cantilever arms 3010 and 3020 which are formed with the integrated tips 2710 and 2720. The cantilever arms 3010 and 3020 can be formed by etching them out of the oxide layer 2910 and metal layer 2920 or by placing the tips 2710 and 2720 onto existing cantilever arms 3010 and 3020. FIGS. 31 and 32 are a cross-sectional view illustrating the release of the cantilevers 3010 and 3020 with integrated tips 2710 and 2720 by etching the silicon preferably with deep reactive ion etching process. For example, the cantilevers 3010 and 3020 and the tips 2710 and 2720 are created by using a thick photoresist or mask to protect the desired portions. The surrounding $SiO_2$ is then etched away. The mask is designed so that only the desired tips 2710 and 2720 are incorporated into the cantilevers 3010 and 3020 while the other tips, such as tips 2730 and 2740 are sacrificed during the $SiO_2$ etch. FIG. 33 is a plan view illustration of the resulting cantilevers 3010 and 3020 and the tips 2710 and 2720. Many of the steps, material and shapes of the cantilevers can be altered without affecting the final structure. For example the either or both of the cantilevers, a part or full, can have smaller width at the end that is attached with the substrate. Also, the cantilevers can be made out of silicon or silicon nitride.

Figure 34:
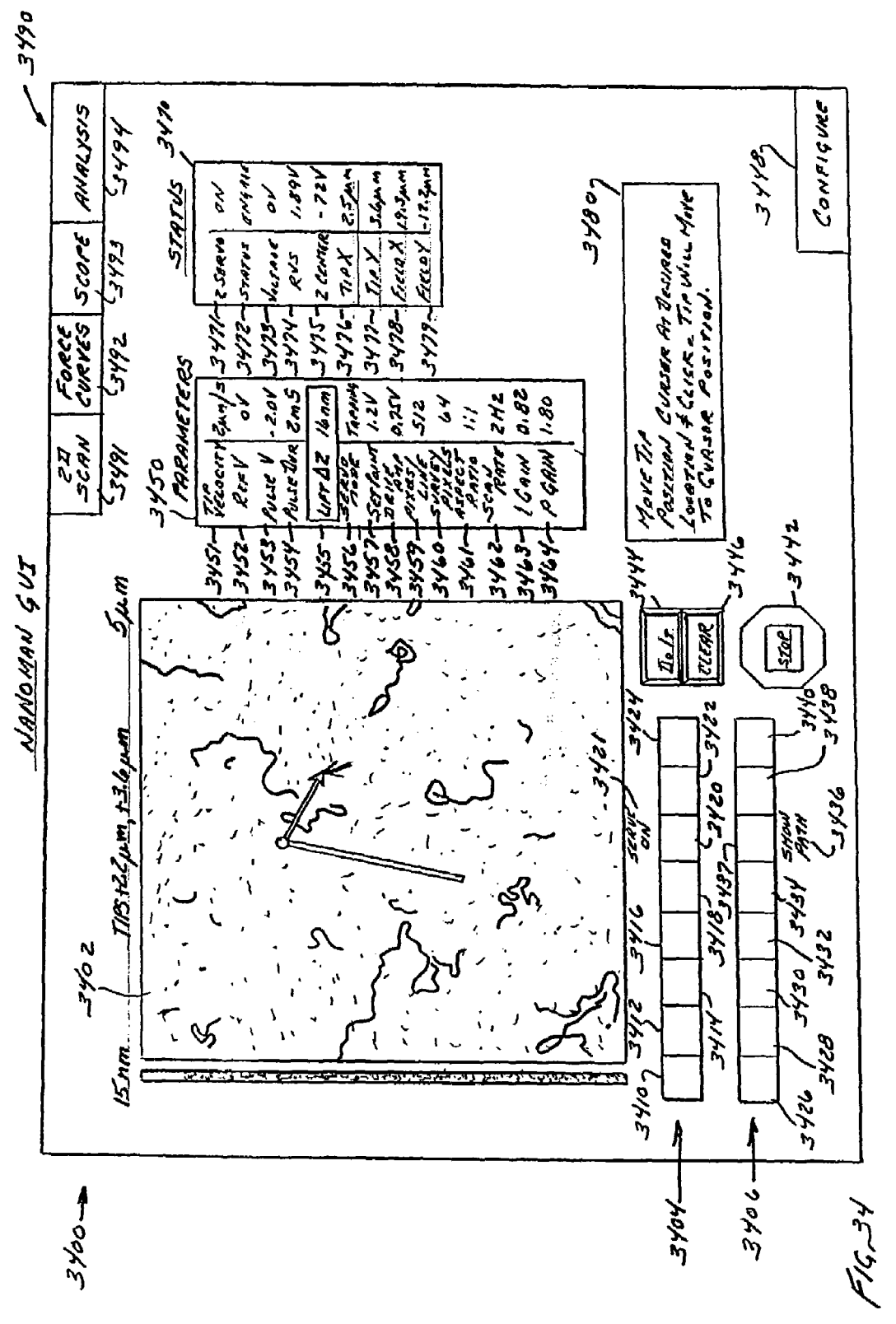

FIG. 34 is an exemplary illustration of a user interface 3400 for use with the probe 100. For example, the user interface 3400 is a graphical user interface (GUI) implemented on the controller 440 of FIG. 4. The GUI is used for nanomanipulation and imaging of a sample where nanomanipulation refers to the controlled positioning and analysis of objects typically at the molecular length scale which is about 1–100 nm. Such nanomanipulation can be applied to electronic devices, fundamental materials science, biology, biotechnology, and other applications where nanomanipulation is useful. In such applications an SPM is used to assemble particles in desired locations on a surface by nudging them with a tip, by transporting them using switchable electrostatic forces between the tip and the particle, and by picking up and dropping particles using nanotweezers. The SPM is also used to cut single molecules, such as DNA, into well-defined segments using the tip at high forces, and then imaging the results nonperturbatively using low forces. The SPM is further used to facilitate construction and tests of molecular-scale devices such as nanotube-based transistors, or the like. The SPM is additionally used to measure electrical characteristics, such as IV curves, at precise locations. The SPM is also used to measure compliance and other mechanical properties of structures such as nanotubes, cells, or other nanoscale structures. The SPM is further used to acquire data as the tip traces a user-defined path. The GUI can also be used with dip pens, nanotweezers, ion-conductance probes, optical sensors, or the like. The GUI can further employ force feedback where a user can feel the tip encounter objects on the surface of a sample. The GUI can be connected to closed-loop scanning hardware, for example, by using reference voltages to determine lateral position. The GUI can also be connected to open-loop scanning hardware by using X-Y offset voltages. The GUI can also be used to employ the SPM to etch and scratch a sample or to move the SPM tip over the surface of a sample while applying a voltage to or across the sample.

The GUI 3400 can include a display screen or playing field that displays an image 3402 received from the probe 100. The image 3402 can be full sized or zoomed in. In addition, the image can be at a resolution of 512 pixels or any other suitable resolution. Many actions can be enabled by direct point-and-click events within this field. Colored cursors and lines can display tip position and path.

The GUI 3400 can also include a row of control/manipulation buttons 3404 for tip movement, voltage control, and the like. The GUI 3400 can further include a row of scan/acquisition/display buttons 3406. Additionally, GUI 3400 can include a parameters box 3450 that displays values of all parameters relevant to control of a probe such as tip voltages, speed of tip moves, often adjusted feedback parameters, and the like. The GUI 3400 can also include a status box 3470 that shows the status of several values of interest. Further, GUI 3400 can include a dialog box 3480 that provides simple instructions for functions currently enabled. For example, the dialog box 3480 can provide instructions for a move function as illustrated. The dialog box 3480 can also show user alerts as appropriate, such as when a safety is triggered. The GUI 3400 can additionally include context icons 3490 that can take a user to other GUI's for 2-D scanning 3491, analysis 3494, force curves 3492, scopes 3493, and the like.

The control/manipulation buttons 3404 can include buttons 3410–3424. The move tip button 3410 can perform basic tip positioning. A move tip mode can be enabled by clicking the move tip button 3410 once and disabled by clicking the button again or by enabling another function. When the move tip mode is enabled, a user can position a cursor at a desired location within the field 3402. Clicking once can cause the tip to move to a cursor position in a straight line with a velocity such as tip velocity 3451. The path history of the tip can be drawn on the field 3402. When the move tip mode is enabled, the dialog box 3480 can display: "Position cursor at desired location and click. Tip will move to cursor position."

The mop button 3412 can enable the tip to track a cursor in real time. When the mop mode is enabled, a user can click on any position in the field 3402. The tip will then track the cursor in real time, with a maximum velocity set by the configure button 3448. Clicking the mop button 3412 once can enable this mode. The path history can be drawn if desired. Double clicking can stop the tracking. When the mop mode is enabled, the dialog box 3480 can display: "Position cursor at desired location and click once; tip will track cursor. Double click to stop."

The path button 3414 can enable the tip to follow a path of line segments drawn on the field 3402. Clicking the path button 3414 once can enable the path mode. When the path mode is enabled, the user can click on a series of positions on the field 3402 to draw a series of line segments. Double clicking ends the series. The do it button 3444 can be used to cause the tip to trace the path of the line segments with a speed set in tip velocity button 3451. The clear button 3446 can erase the path and allow the GUI to wait for another path. The path history can be drawn if desired. Double clicking can stop the tracking. When the path mode is enabled, the dialog box 3480 can display: "Click at a series of points to draw path. Double click to end path. Then select Do It to move and Clear to erase path and redraw."

The pulse voltage button 3416 can switch the tip voltage from a Ref V 3452 voltage to a Pulse V 3453 voltage for a duration of Pulse Dur 3454 as set in the parameters box 3450. When the pulse mode is enabled, after the first pulse, the dialog box 3480 can display: "Pulses tip voltage once with each click."

The switch voltage button 3418 can cause the tip voltage to be switched from a current state to another state. For example, the tip voltage can switch from the voltage defined in Ref V 3452 to the voltage defined in the Pulse V 3453, the tip voltage can switch polarity, or the tip voltage can switch to any other useful voltage. When the switch mode is enabled, the dialog box 3480 can display: "Switches tip voltage to opposite state."

The lift tip button 3420 can act as a toggle. For example, the lift tip button 3420 can cause feedback to be turned off to the tip and the tip lifted to a height $\Delta z$ 3455 by a z actuator such as a piezo. The servo on button 3421 is then enabled. The servo stays off until the button is pressed again. Pressing the servo on button 3421 can turn the feedback on and cause the tip to seek the surface of the sample. This mode can be useful for moving particles around the surface of the sample.

The reset z button 3422 can correct for z drift. This button can be enabled only when the feedback is off and the tip is lifted. The reset z button 3422 can cause feedback to temporarily seek a surface and redefine a tip/sample relationship. For example if a tip is in TappingMode™, tapping oscillation and feedback are turned on. Once the surface is found, the feedback and drive oscillation are turned off. The tip and sample separation is then equal to half the tip oscillation amplitude, which should be known in nm if the system sensitivity is appropriately calibrated. The z height is then adjusted to bring the tip back to lift $\Delta z$ 3455. This mode can be accurate to, for example, about 2 nm. If the tip is in contact mode, deflection can be used to trigger in a similar manner.

The run script button 3424 can open a file-pick box from which a user can select, for example, a lithography script to run. During execution, tip motion is shown in the field 3402 and the path history can be drawn in the field 3402.

The scan/acquisition/display buttons 3406 can include buttons 3426–3440. The refresh field button 3426 can cause the entire field 3402 to be scanned with currently set scan parameters. Frame location and zooming functions can be set using the configure button 3448. The refresh region button 3428 can allow the user to define a region on the field 3402. For example, the user or the GUI can draw a box on the field 3402 defining a region. The user can resize and reposition the box. By pressing the do it button 3444, the region within the box is rescanned. Thus new data can replace old data in the box in the field 3402.

The survey button 3430 can cause the entire field 3402 to be coarsely rescanned using current scan parameters set using, for example, the configure button 3448. Also, the resolution of the survey rescan can be set in the survey pixel parameter 3460.

The zoom button 3432 can cause a box to be drawn on the field by the user or by the GUI. The user can then size and locate the box to select a region to be zoomed in. The GUI zooms in to the selected area when the user presses the do it button 3444. The user can use the configure button 3448 to set the system to zoom in by rescanning the area or to zoom in on the area with data currently in the system.

The move field button 3434 can cause a cross cursor to be drawn in the center of the field 3402. The user can then click on the field 3402 to grab the cursor and move the center to a new position. Clicking again can cause the cursor location to define the center of a new field 3402. Additional positioning and clicking can refine the positioning. The user can then click the do it button 3444 to translate the image 3402 accordingly. Newly exposed regions can be left blank until refreshed or can be scanned upon translation.

The hide path button 3436 can cause the tip path to be displayed or hidden when the tip moves. The mode can default to show the path. The path can remain until the field 3402 or a region is refreshed or the button is pressed. The hide path button 3436 can then change to read "show path" when the path is hidden. Switching back to show the path can then cause any subsequent tip paths to be shown.

The accent changes button 3438 can be used to highlight data that may differ from the most recent scan. For example, regions that are manipulated can be highlighted until the manipulated regions are rescanned. This feature is not necessary when the image is scanned while the image is being manipulated.

The capture button 3439 can cause the current field to be captured and a file save box to open for saving the image. The stop button 3442 can stop any current action. The do it button 3444 can be enabled as appropriate for the functions described above. The clear button 3446 is also enabled as appropriate for the functions described above. For example, a user can clear a drawn path by hitting the clear button 3446.

The configure button 3448 can open a menu for configuring parameters and options of the GUI. Features that can be configured include refresh preferences, options to hide status boxes, zoom configuration, and z safety configuration. The z safety configuration prevents damage to a tip that can result from moving the tip into a sloping surface and tall obstacles. The z safety configuration also configures the system to monitor if the tip drifts. For example, manipulation can be disabled and an alert shown when the tip drifts out of an acceptable range or when DC deflections exceed a trigger. Parameters for z safety can include on/off, z center range in volts relative to zero volts, and DC trigger voltage.

The parameters box 3450 can display values of the operation of the probe in real time, if necessary. The values can be disabled if appropriate or overridden by lithography scripts. Values can be changed by numerical entry, arrow keys/buttons, or any other suitable manner. Tip velocity 3451 is in effect during lateral movement of the tip. Ref V 3452 is the default tip voltage. Pulse Voltage 3452 is the tip voltage applied when the voltage of the tip is pulsed using the pulse button 3416 or switched with the switch voltage button 3418. Pulse Dur 3454 sets the length of a voltage pulse when the pulse button 3416 is pressed. Lift $\Delta z$ 3455 is for tip and surface spacing is enabled when feedback is off. This allows the tip to be lifted a desired distance above a surface or pushed into the surface with negative values. This parameter is disabled when feedback is on.

Servo Mode 3456 is for selecting TappingMode™ or contact mode. It is active when feedback is on and can be switchable at all times. Setpoint 3457 is in effect during lateral moves and scans and is enabled when feedback is on. Drive Amp 3458 is active when TappingMode™ is enabled and can be applied with feedback on or off. Pixels/Line 3459 is for setting the data or pixel density in the field 3402. Survey Pixels 3460 is for setting the pixel density used in a survey scan. Aspect Ratio 3461, Scan Rate 3462, I Gain 3463, and P Gain 3464 all are for parameters as described.

The status box 3470 can display various useful system values 3471–3479 that might not otherwise be shown. The values can be collected for easy reference. The status box 3470 can be hidden by using the configure box 3448.

Figure 35:
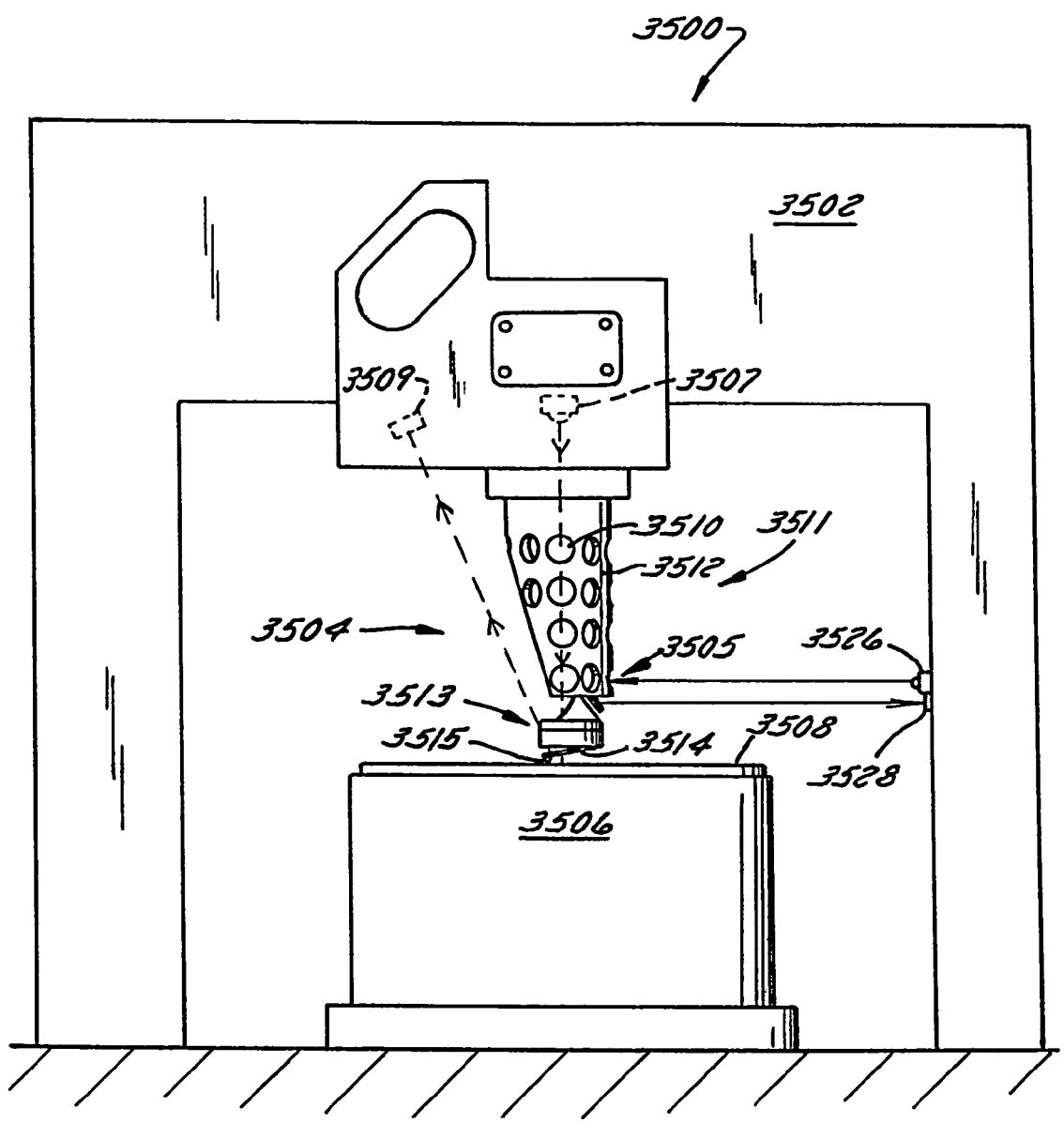
FIG. 35 is an exemplary illustration of a scanning probe microscope system according to one embodiment.

Referring to FIG. 35, a scanning probe microscope (SPM) 3500 is shown. The SPM 3500 can be used in conjunction with the probe 100. The SMP 3500 includes a chassis including a support 3502 to which an actuator assembly 3504 is attached. In addition, a sample base 3506 is fixed to support 3502 and is configured to accommodate a sample 3508. The actuator assembly 3504 includes an actuator 3510, a reference assembly 3511 comprising, among other structure, an elongate reference structure 3512 that surrounds actuator 3510, and a probe assembly 3513. Preferably, reference structure 3512 is tubular and has a longitudinal axis that is generally collinear with the longitudinal axis of actuator 3510. Actuator 3510 can be piezoelectric or electrostrictive, and is a tube actuator or another type of actuator conventional in the art of nanopositioning systems.

At a lower free end 3505 of actuator assembly 3504, a probe assembly 3513 is attached and includes a cantilever 3514 having a stylus 3515 attached thereto. The cantilever 3514 and the stylus 3515 can comprise the probe 100. During operation, stylus 3515 is scanned across the surface of a sample 2508 to determine surface characteristics (e.g., topography) of the sample. The scanning operation is provided by actuator 3510, which is driven by program-controlled signals (e.g., appropriate voltages) to cause the actuator 3510 to move laterally in two dimensions across the surface of sample 3508, as well as to extend and retract the probe assembly 3513, i.e., to move cantilever 3514 toward or away from the sample, typically in response to closed loop signals derived from sensor a 3509. As a result, the actuator 3510 preferably can translate the cantilever 3514 in three orthogonal directions under program control. Note that for convenience we will refer to the extending and retracting of the probe assembly 3513 toward and away from sample 3508 as motion in the Z direction, and translation laterally across the surface of the sample as motion in the X direction and the Y direction, where the X and the Y axes are orthogonal to each other and define a plane substantially parallel to the surface of sample 3508. This nomenclature is used purely for convenience to indicate three orthogonal directions.

Figure 36A:
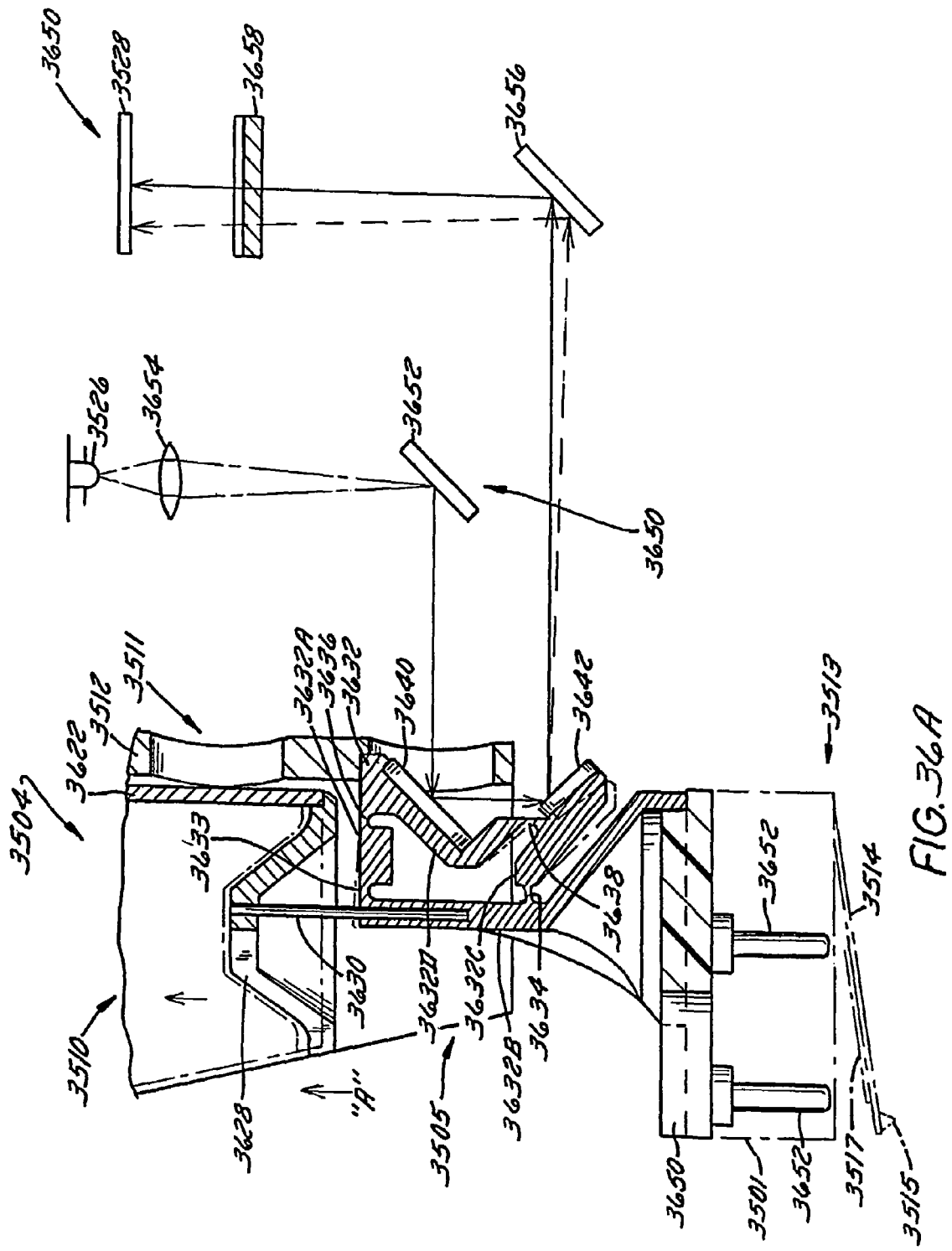
FIG. 36A is an exemplary illustration of a scanning probe microscope system according to various embodiments.

Referring to FIGS. 35 and 36A, an electromagnetic radiation source 3526 (e.g., a laser) is fixed to support 3502. In operation, the source 3526 directs light towards a lower portion 3505 of actuator assembly 3504, while detector 3528 receives light from the light source 3526 after it has reflected off this lower portion 3505 so as to monitor the amount of actuator movement. Electromagnetic radiation detector 3528 is fixed relative to support 3502 as well, and is employed as part of a measuring device 3650 to determine the amount of translation of at least part of the actuator 3510.

With more specific reference to FIG. 36A, the source 3526 of measuring device 3650 may be mounted so as to direct a beam of light generally vertically toward a mirror 3652 positioned to deflect the beam towards the lower portion 3505 of assembly 3504. Preferably, a focusing lens 3654 is disposed between light source 3526 and mirror 3652. The beam is then deflected toward a sensor 3528 (e.g., a position sensing photodiode) via the mirror 3656. A cylindrical lens 3658 may be disposed between the mirror 3656 and the sensor 3528 (or can be located at any point between source 3526 and sensor 3528 as desired) to again enhance precision.

Still referring to FIGS. 35 and 36A, to monitor, for example, topographical changes on the surface of the sample and provide appropriate feedback depending on the mode of SPM operation, an electromagnetic radiation source 3507 (shown in FIG. 35) is fixed to support 3502. Source 3507 generates radiation that is directed through actuator 3510 towards a mirror 3517 supported by a surface of cantilever 3514 of probe assembly 3513. Mirror 3517, in turn, directs the radiation toward detector 3509 (shown in FIG. 35). Mirror 3517 may, in the alternative, be a polished portion of the back (upper) side of the cantilever 3514. The detector 3509 receives the light reflected from the probe 3514 and, in turn, generates a signal indicative of, for example, the deflection of the probe 3514, as is conventional in the art.

Figures 36B, 36C:
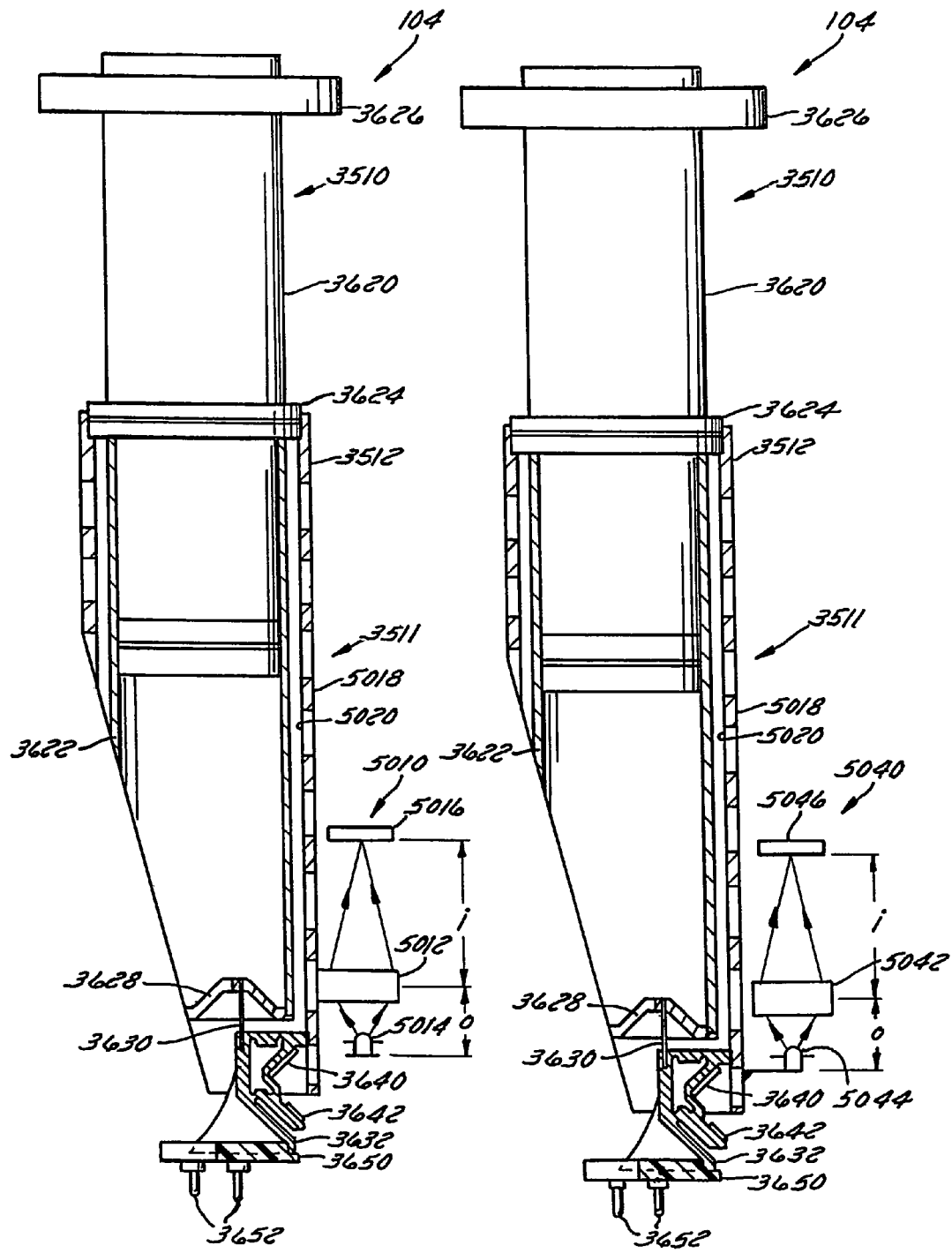

The entire actuator assembly 3504 is shown in more detail in FIG. 36B. Actuator assembly 3504 includes actuator 3510 (preferably a piezoelectric tube) and reference assembly 3511 which in turn comprises reference structure 3512, coupling mount 3628, flexible bar coupling 3630, flexure 3632, and slotted disk 3650 as described in detail below.

In the preferred embodiment of the present invention, actuator 3510 is formed of two sections; first, an upper section 3620 that is configured to deflect laterally in a plane lying perpendicular to the axis of the actuator under program control. For this reason it is termed an X-Y tube. Actuator 3510 also includes a lower Z tube actuator 3622 that is adapted to extend or retract in a direction substantially parallel to the longitudinal axis of the tube under program control. A discussion of a means for controlling such actuators can be found, for example, in U.S. Pat. No. 6,008,489 and other related applications.

Two tubes 3620, 3622 of the piezoelectric actuator 3510 are coupled together end-to-end proximate to a circular collar 3624 that extends around and is fixed to the actuator 3510. Assembly 3504 is preferably coupled to frame 3502 of the scanning probe microscope with a flange 3626 that is fixed to the top of X-Y tube 3620. In this preferred embodiment, tubular member or elongate reference structure 3512 of reference assembly 3511 extends around at least the Z tube 3622 of the actuator 3510 and is fixed to collar 3624. Collar 3624, in turn, is fixed to the actuator 3510 at or near the junction of the upper and lower actuator sections. When X-Y tube 3620 is driven under program control, it deflects in a direction generally perpendicular to the longitudinal axis of actuator 3510. Since collar 3624 and hence structure 3512 are fixed to the actuator near the bottom of X-Y tube 3620, they also deflect laterally.

On the other hand, when Z tube 3622 is driven under program control it does not extend or retract collar 3624. Therefore, structure 3512 will not extend or retract since it is coupled to collar 3624. When Z tube 3622 extends or retracts, it extends or retracts relative to structure 3512 which causes a substantial change in the relative position of the two at the lower (or free) end of Z tube 3622.

Semi-circular coupling mount 3628 is fixed to the lower end of Z tube 3622 and translates together with Z tube 3622 when Z tube 3622 extends and retracts. Reference assembly 3511 also includes a flexible bar coupling 3630 that, in turn, is fixed to coupling mount 3628. Bar 3630 is configured so that when Z tube 3622 extends and retracts, the bar correspondingly extends and retracts with respect to structure 3512.

In the preferred embodiment of the present invention, an optical measuring apparatus 5010 measures movement of probe assembly 3513 in the X and/or Y directions (e.g., the XY plane) in response to voltage signals applied to X-Y actuator 3620. Optical measuring apparatus 5010 includes an objective 5012 fixed to reference structure 3512, a light source 5014, and a position sensor 5016. Movement of objective 5012 depends on movement of reference structure 3512, while light source 5014 and position sensor 5016 are stationary. Objective 5012 is located between light source 5014 and position sensor 5016.

In operation, flexible bar coupling 3630 and reference structure 3512 provide a rigid mechanical connection in the XY plane between probe assembly 3513 and the bottom of X-Y actuator 3620, therefore minimizing any error introduced by Z tube 3622 in the XY plane as described above. Movement of reference structure 3512 is thus indicative of accurate movement of probe assembly 3513 in the XY plane in response to voltage signals applied to X-Y actuator 3620. Likewise, movement of objective 5012 mounted to reference structure 3512 corresponds to movement of probe assembly 3513 in the XY plane.

Optical measuring apparatus 5010 provides optical magnification between light source 5014 and position sensor 5016. In operation, X-Y actuator assembly 3620 is actuated in response to voltage signals and moves in a particular direction (e.g., in the X and/or Y directions), thereby causing reference structure 3512 and corresponding objective 5012 to move. The position at which a beam of electromagnetic radiation from light source 5014 (e.g., a light beam) contacts position sensor 5016 through objective 5012 is indicative of the movement of probe assembly 3513 as position sensor 5016 and light source 5014 are both fixed. In particular, the magnification provided by objective 5012 is based on:

$$M=1+i/o$$

where "i" is the orthogonal distance from the principal plane of objective 5012 to position sensor 5016, and "o" is the orthogonal distance from the principal plane of objective 5012 to light source 5014. Objective 5012 provides optical magnification to increase the signal-to-noise ratio by multiplying the signal by a factor of M (e.g., if M=5, for every micrometer that objective 5012 moves in the X and/or Y directions, the light beam moves across position sensor 5016 by 5 micrometers, thereby increasing the signal-to-noise ratio by a factor of 5). Objective 5012 further comprises a set of separate microlenses (e.g., 3) that is fixed to an outside surface 5018 of reference structure 3512 opposite an inside surface 5020 adjacent to Z tube 3622.

Position sensor 5016 is an XY position sensor (e.g., a silicone photodiode) configured to detect the position of the light beam and generate a displacement signal indicative of movement of probe assembly 3513 in response to voltage signals applied to X-Y actuator 3620 (e.g., in a direction generally perpendicular to the longitudinal axis of actuator 3552).

Turning to FIGS. 36C and 36D, alternate embodiments of the measuring device 5010 as illustrated in FIG. 36B are shown. In FIG. 36C, measuring device 5040 includes a light source 5044 that is fixed to reference structure 3512, an objective 5042, and a position sensor 5046. In this case, movement of the light source 5044 depends on the movement of the reference structure 3512, while objective 5042 and position sensor 5046 are stationary. Objective 5042 is located between light source 5044 and position sensor 5046. In this embodiment the magnification of the lens preferably equals, $$M=i/o$$

where "i" is the orthogonal distance between the principal plane of objective 5042 and the position sensor 5046, and "o" is the orthogonal distance between the light source 5044 and the principal plane of objective 5042.

Turning to FIG. 36D, measuring device 5060 includes a light source 5064, an objective 5062, and a position sensor 5066 that is fixed to reference structure 3512. In this case movement of the position sensor 5066 depends on the movement of the reference structure 3512, while light source 5064 and objective 5062 are stationary. Objective 5062 is located between light source 5064 and position sensor 5066. In this embodiment there is no magnification of the objective and therefore the magnification preferably equals, $$M=1$$

Referring again to FIG. 36A, the lower end of a flexible bar coupling 3630 is fixed to the probe support assembly or flexure 3632 of reference assembly 3511. Flexure 3632 is preferably formed out of a solid block of material, and comprises aluminum or a similarly light alloy. The flexure 3632 is generally in the form of a movable bar assembly or four bar linkage. These links are identified in FIG. 36A as 3632A, 3632B, 3632C and 3632D.

Flexible bar coupling 3630 is fixed to link 3632B of flexure 3632. When the Z tube 3622 retracts in the direction marked "A," for example, the bar 3630 translates with the free end of the Z tube 3622. Because the Z tube 3622 is retracting, the bar 3630 is pulled upwardly toward the upper end of the actuator. This causes the link 3632B to translate upwardly substantially the same distance that the end of the Z tube 3622 translates upwardly.

The link 3632B is supported at flexible joints 3633 and 3634 to links 3632A and 3632C, respectively. The links 3632A and 3632C are coupled to the link 3632D at flexible joints or linkages 3636 and 3638, respectively. When the link 3632B is pulled upwardly (again in the direction marked "A") from a relaxed position as shown in phantom in FIG. 36A, links 3632A and 3632C are deflected upwardly at one end by the link 3632B. The other end of the links 3632A and 3632C generally rotate about joints 3636 and 3638 (also shown in phantom).

Links 3632A and 3632C are preferably of generally equal length and are parallel to each other. Similarly, the links 3632D and 3632B are preferably of equal length and parallel to each other. The link 3632D is fixed to the lower end of the structure 3512. Because the structure 3512 does not translate upwardly or downwardly when the Z tube 3622 moves upwardly or downwardly (due to its connection to a collar fixed on the actuator 110 above the Z tube 3622) any expansion or contraction of the Z tube 3622 upwardly or downwardly causes the four bar linkage of flexure 3632 to deflect about joints 3633, 3634, 3636 and 3638. Preferably, a thickness $t_1$ of each of the links is approximately 0.9 mm, while the thickness $t_2$ of each of the joints is approximately 0.08 mm.

Thus, when the four bar linkage made of the links 3632A–D is deflected upwardly or downwardly, they form a parallelogram arrangement and there is substantially no rotation of link 3632B, only translation. As a result, the link 3632B is preferably constrained to simply translate upwardly or downwardly.

In operation, electromagnetic radiation from the source 3526 is reflected off a mirror 3640 of measuring device 3650, the mirror 3640 being mounted on flexure 3632, particularly link 3632D. This light is reflected downwardly and is reflected again, this time off a mirror 3642, which is also fixed to flexure 3632, particularly link 3632C. The light reflected off mirror 3642 then is directed towards the detector 3528, which generates a signal indicative of the location at which the reflected light impinges upon the detector 3528. The signal provided by the detector 3528 changes depending upon the degree of deflection of the four bar linkage of flexure 3632.

More particularly, comparing the relaxed position of the flexure 3632 in FIG. 36A to the upwardly deflected position shown in phantom, it is clear that upward deflection of link 3632B causes link 3632C to rotate about joint 3638. This in turn causes mirror 3642 to rotate about joint 3638. This movement of the mirror 3642 causes the light beam to reflect off the mirror 3642 at a different angle than when the beam is reflected off the mirror 242 when the flexure is in the relaxed position. As a result, the beam moves to a position on the detector 3528 that is displaced from the initial location of the beam, as shown in phantom. It is this change in the position of light impinging on detector 128 that causes a change in the signal generated by the detector 3528, and hence, provides an indication that link 3632B has translated upwardly or downwardly with respect to the free end of structure 3512 to which link 3632D is fixed.

Notably, mirrors 3640 and 3642 are preferably disposed with respect to each other such that the light sensed by detector 3528 is substantially immune to lateral deflections of the member 3512. In the embodiment shown in the figures, there are several structural elements that individually and collectively contribute to this immunity. In particular, the mirrors 3640 and 3642 are disposed to return light to the detector 3528 in a path substantially parallel to the path of the light impinging upon mirror 3640 of the measuring device 3650, and thus form what is akin to a corner cube retro-reflector. As the Z tube 3622 moves, the mirrors 3640 and 3642 maintain their general orthogonal relationship, albeit in displaced fashion, thus affording accurate measurements of Z displacement. Another feature that contributes to this accuracy is the fact that the path of light impinging upon the mirror 3640 and the path of light reflected from the mirror 3642 are substantially parallel to the surface of the sample (108 in FIG. 35).

When the structure 3512 is deflected laterally across the surface of the sample, by activation of a X-Y tube, for example, mirrors 3640 and 3642 are also deflected. This occurs whether or not there has been any upward or downward motion of Z tube 3622 with respect to the member 3512. Due to the arrangement of the incoming and outgoing beams from mirrors 3640 and 3642 and the orientation of those mirrors with respect to each other, any lateral deflection will not substantially change the signal impinging on detector 3528, and detector 3528 will continue to generate a signal indicative of the height of the flexure 3632 (and particularly link 3632B), and therefore the probe above the sample generally without error.

The above-described apparatus is thus used to isolate the movement of Z tube 3622 in its intended Z direction, yet permit free lateral motion of the lower end 3505 of the actuator assembly 3504. At the lower end of the actuator assembly 3504, reference assembly 3511 includes a slotted disk 3650 having four mounting pins 3652 (two shown), the slotted disk 3650 being fixed to the lower portion of link 3632B. Next, the probe assembly 3513 includes a probe base 3501 (shown in FIG. 36A in phantom lines) that can be plugged or unplugged from the pins 3652 to hold the probe base 3501 onto the slotted disk 3650. Probe assembly 3513 also includes cantilever 3514 fixed on one end to the probe base 3501, and a stylus 3515 attached to the free end of cantilever 3514.

The light source 3507 generates light that travels down through the actuator 3510, and is reflected off mirror 3517 and returns to detector 3509. Whenever the cantilever 3514 is flexed upwardly or downwardly about its mounting point, mirror 3517 rotates about the fixed end of cantilever 3514 and causes the light generated by source 3507 to move with respect to detector 3509. This movement, in turn, causes a change in the signal generated by detector 3509 that indicates a change in the amplitude of the deflection of cantilever 3514, and hence a change in the force and/or distance relationship of the probe assembly 3513 and the sample surface 3508.

Typically, to determine the height of various features at different locations on the sample surface, probe assembly 3513 is moved laterally across the surface of the sample 3508. In operation, to direct the probe laterally, an electrical signal is applied to an X-Y tube, which in turn causes the lower portion 3505 of the actuator assembly 3504 to deflect in relation to the sample 3508. Depending upon the signals applied to the X-Y tube, this can cause the probe assembly 3513 to move in two orthogonal directions across the surface of the sample.

In one mode of operation, the stylus 3515 is in contact with the sample, and slight deflections of the cantilever 3514 caused by its moving over the sample are measured. This is called "contact" mode. As the stylus 3515 is deflected upwards, it moves cantilever 3514 and mirror 3517. This change in the position of mirror 3517 causes the reflected light to move across detector 3509. The output of the detector 3509 is fed back to the Z tube 3622. Thus, flexing of the cantilever 3514 is a function of the signal provided by detector 3509. In typical operation, the amount of flexing of cantilever 3514 is maintained constant by extending or retracting Z tube 3622 (e.g., lengthening or shortening) in response to a signal based on the output of the detector 3509. When the stylus 3515 reaches a surface asperity that causes the cantilever 3514 to flex upward, therefore deflecting light with respect to detector 3509, the SPM 3500 attempts to restore the cantilever 3514 to the same position on or above the surface of the sample. This capability is provided by the data acquisition and control module 3702 shown in FIG. 37 that extends or retracts Z tube 3622 in order to restore cantilever 3514 to its original deflection.

In TappingMode™ operation, an oscillator (not shown) causes the free end of cantilever 3514 to oscillate up-and-down, typically at or near its resonant frequency. As probe assembly 3513 approaches the surface of the sample, interaction between the surface 3508 and the stylus 3515 causes the amplitude (or phase) of these oscillations to change. The angle of the radiation reflected from mirror 3517 changes in amplitude accordingly and causes a change in the location of the reflected light incident upon detector 3509. Detector 3509, in turn, generates a signal indicative of the changed amplitude and provides this signal to the control circuitry 3700 shown in detail in FIG. 37. The control circuitry 3700 in turn provides a control signal to Z tube 3622 to adjust its length to move the stylus 3515 up or down until the cantilever 3514 returns to the desired oscillation amplitude. The control signal is thus indicative of surface features of the sample 3508.

Figure 37:
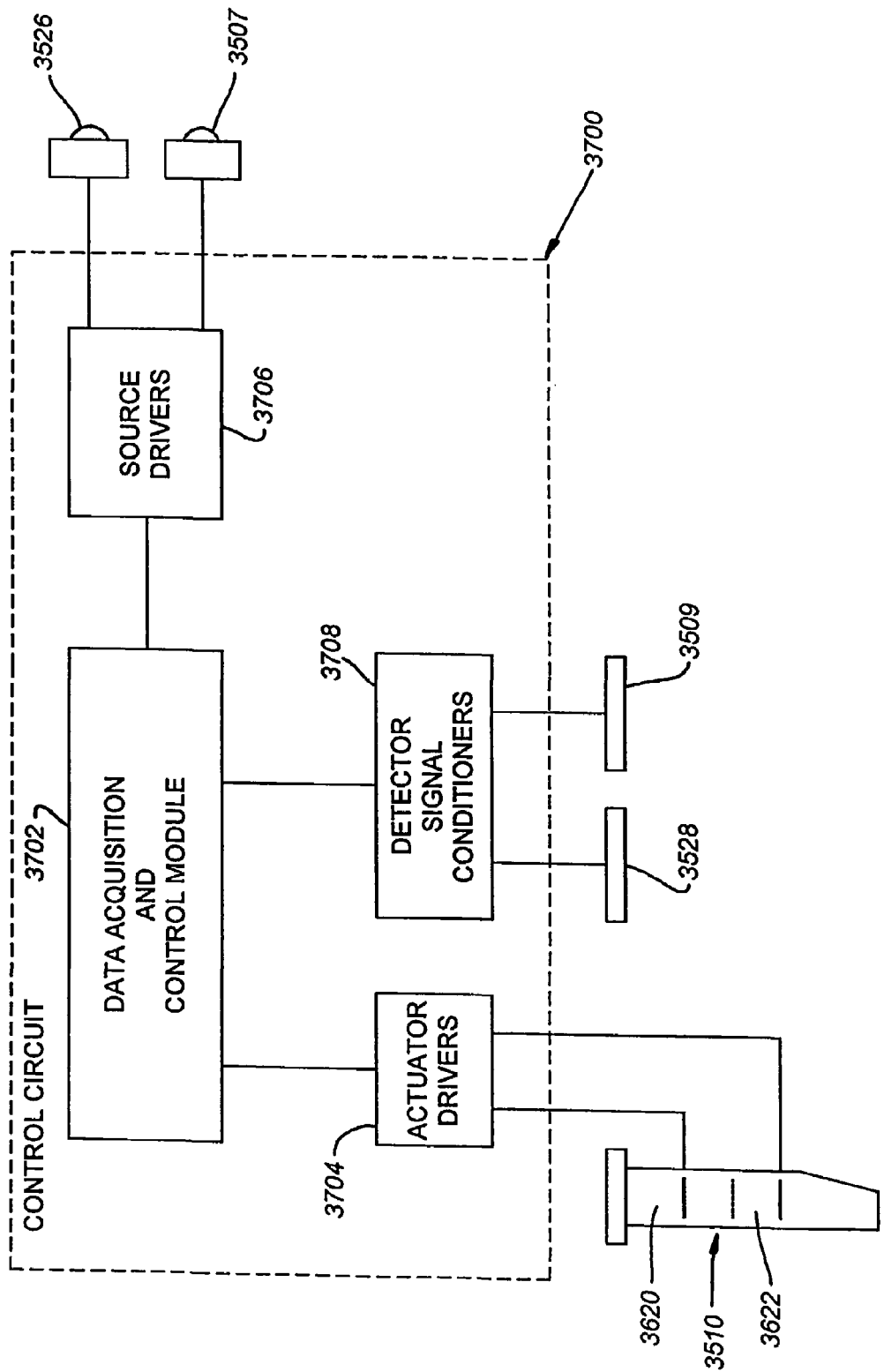
FIG. 37 is an exemplary illustration of control circuitry for a scanning probe microscope system according to one embodiment.

Referring still to FIG. 37, a control circuit 3700 is shown connected to sections 3620 and 3622 of an actuator 3510 such as a piezoelectric tube actuator, detectors 3528 and 3509, and sources 3526 and 3507. Control circuit 3700 includes data acquisition and control module 3702 which is coupled to and drives actuator drivers 3704 and source drivers 3706. Actuator drivers 3704 are in turn coupled to tube actuators 3620 and 3622 of actuator 3510. These drivers 3704 generate high voltage signals necessary to cause a X-Y tube to move laterally and Z tube 3622 to expand and contract vertically. Source drivers 3706 are coupled to and drive radiation sources 3526 and 3507. Control module 3702 is also coupled to and receives signals from detector signal conditioner 3708. Signal conditioner 3708 receives the raw signals from the two radiation detectors 3528, 3509 and converts them into signals that can be read by control module 3702.

Control module 3702 includes a series of instructions that controls the operation of control circuit 3700 and hence, the operation of actuator 3510. This includes instructions that receive and process signals transmitted from detector signal conditioners 3708 that are indicative of the radiation falling on detectors 3509 and 3528. The instructions also include instructions that transmit appropriate signals to actuator drivers 3704 causing actuator drivers 3704 to generate the appropriate high voltage signals to tubes 3620 and 3622 of actuator 3510. Control module 3702 also includes instructions to generate signals and transmit them to source drivers 3706 causing source drivers 3706 to properly control the radiation emitted by sources 3507 and 3526.

Control module 3702 monitors changes in the signal generated by detector 3509 and determines, based upon changes in the signal, that the cantilever 3514 has been deflected, either upwardly or downwardly in contact mode, or that its amplitude of oscillation, in TappingMode™, has increased or decreased. In response to this signal, the control module 3702 attempts to raise or lower the probe assembly 3513 until the signal generated by detector 3509 returns to its original level. To do this, the control module 3702 generates a signal and applies it to Z tube 3622 of the piezoelectric tube actuator 3510, which in turn causes it to contract or expand depending on the signal. This contraction or expansion pulls flexible bar coupling 3630 upwardly or downwardly, which in turn pulls link 3632B upwardly or pushes it downwardly, respectively. Link 3632B is mechanically coupled to the fixed end of cantilever 3514 causing it to move with bar 3630. This motion of the fixed end of cantilever 3514 causes mirror 3517 to be restored to its original orientation, and hence, causes the light falling on detector 3509 to generate its original signal levels. These restored signal levels are sensed by control module 3702 that then stops changing the signal applied to Z tube 3622. In summary, the height information is interpreted from the voltage fed to the Z tube 3622. Specifically, the voltage fed to the Z tube 3622 as part of the usual feedback process of maintaining constant cantilever amplitude or deflection is also read by the data acquisition and control module 3702 as an indication of sample asperity height.

In accordance with the novel principles of the present invention, accurate Z height information is independently derived from detector 3528 while the usual feedback process described above continues. Specifically, the control module 3702 uses the signal provided by detector 3528 to determine the height of probe assembly 3513 in the following manner. Again, we will assume that the stylus 3515 is being translated across the surface of sample 3508 and reaches an asperity. As in the previous case, this will flex cantilever 3514 upwardly in contact mode or reduce the amplitude of oscillation of the cantilever 3514 in TappingMode™ and cause the signal to change at detector 3509. Again, the controller 3702 will cause section 3622 to contract by changing the signal applied to it. This, in turn, causes flexure 3632 to move upwardly. As shown in FIG. 36A, this upward motion causes mirror 3642 to deflect downwardly and outwardly away from mirror 3640 and causes the light generated by source 3526 to fall on a different portion of detector 3528. The signal that falls on detector 3528 is a function of the height of flexure 3632, and hence the height of the fixed end of cantilever 3514. In this case, therefore, controller module 3702 reads the signal generated by detector 3528 and determines the height of flexure 3632 (and hence, probe assembly 3513) directly.

The preferred embodiment also avoids another positional error due to lateral deflection of Z tube 3622 when it contracts or expands. It is important in most measuring processes to determine not only the height of the surface of sample 3508, but also the location at which that height measurement occurred. The Z tube 3622 can undesirably deflect laterally when it contracts or expands. Without reference structure 3512, this would cause the probe to steer slightly forward, backward, to the left, or to the right across the surface of the sample, rather than moving straight upwardly or downwardly. Link 3632B, which translates upwardly and downwardly together with flexure 3632 and the probe itself, is isolated from these lateral deflections of Z tube 3622. It communicates only the expansion and contraction of Z tube 3622 to the probe.

The four bar linkage of flexure 3632 ensures that the probe itself can only translate upwardly and downwardly with respect to member 3512. It is flexible bar coupling 3630 that absorbs this lateral motion and prevents it from being communicated to probe assembly 3513 when Z tube 3622 expands or contracts. Flexible bar coupling 3630 has sufficient flexibility that it can deflect slightly from side to side throughout its length. It is provided with a length sufficient to permit these lateral deflections of the coupling 3630 to occur without introducing significant errors into the system. In this manner, member 3512 is isolated from longitudinal motion of the piezoelectric actuator 3510, but will communicate (X,Y) plane motions to flexure 3632. Flexible bar coupling 3630, flexure 3632 and particularly link 3632B are isolated from lateral movement generated by the expansion and contraction of Z tube 3622, yet substantially duplicate the upward and downward motion of Z tube 3622 and transmit it to probe assembly 3513. Thus, flexure 3632 can provide for accurate positioning of a probe 100 such as a nanomechanical tweezers.

Thus, this embodiment provides an assembly including an actuator 3504 with a longitudinal axis having a fixed end, and a free end configured to translate in at least one direction with respect to the fixed end, a multiple bar linkage having first and second links mutually constrained to translate with respect to each other, and wherein the first link is fixed to a reference structure and the second link is constrained to translate in a direction generally parallel to the longitudinal axis of the actuator, a coupling having first and second ends, the first end being fixed to the actuator proximate to its free end, and the second end being fixed to the second link, the coupling adapted to transmit displacement in a direction substantially parallel to the longitudinal axis of the actuator, an objective fixed to the reference structure, wherein the objective is between a light source and a position sensor, and the position sensor measures displacement of the objective in at least one direction generally perpendicular to the longitudinal axis of the actuator, and a probe coupled to the actuator, wherein the probe is configured to manipulate the surface of a sample.

The light source and the position sensor can be stationary. The objective can include a set of microlenses. The set of microlenses can provide optical magnification to increase a signal-to-noise ratio. The magnification can be $M=1+i/o$ where i is an orthogonal distance from the principal plane of the set of microlenses to the position sensor and o is an orthogonal distance from the principal plane of the set of microlenses to the light source. Movement of a beam of electromagnetic radiation from the light source directed to the position sensor through the set of microlenses can be multiplied by a factor of M. The assembly can be a scanning probe microscope. Also, the actuator can be a piezoelectric or electrostrictive actuator. The probe can include a cantilever, a first tip mounted on the cantilever, and a second tip mounted on the cantilever, the first and the second tip being configured to combine to form an imaging tip. A voltage can be applied across the first tip and the second tip to combine the first tip and the second tip to form an imaging tip.

Figure 38:
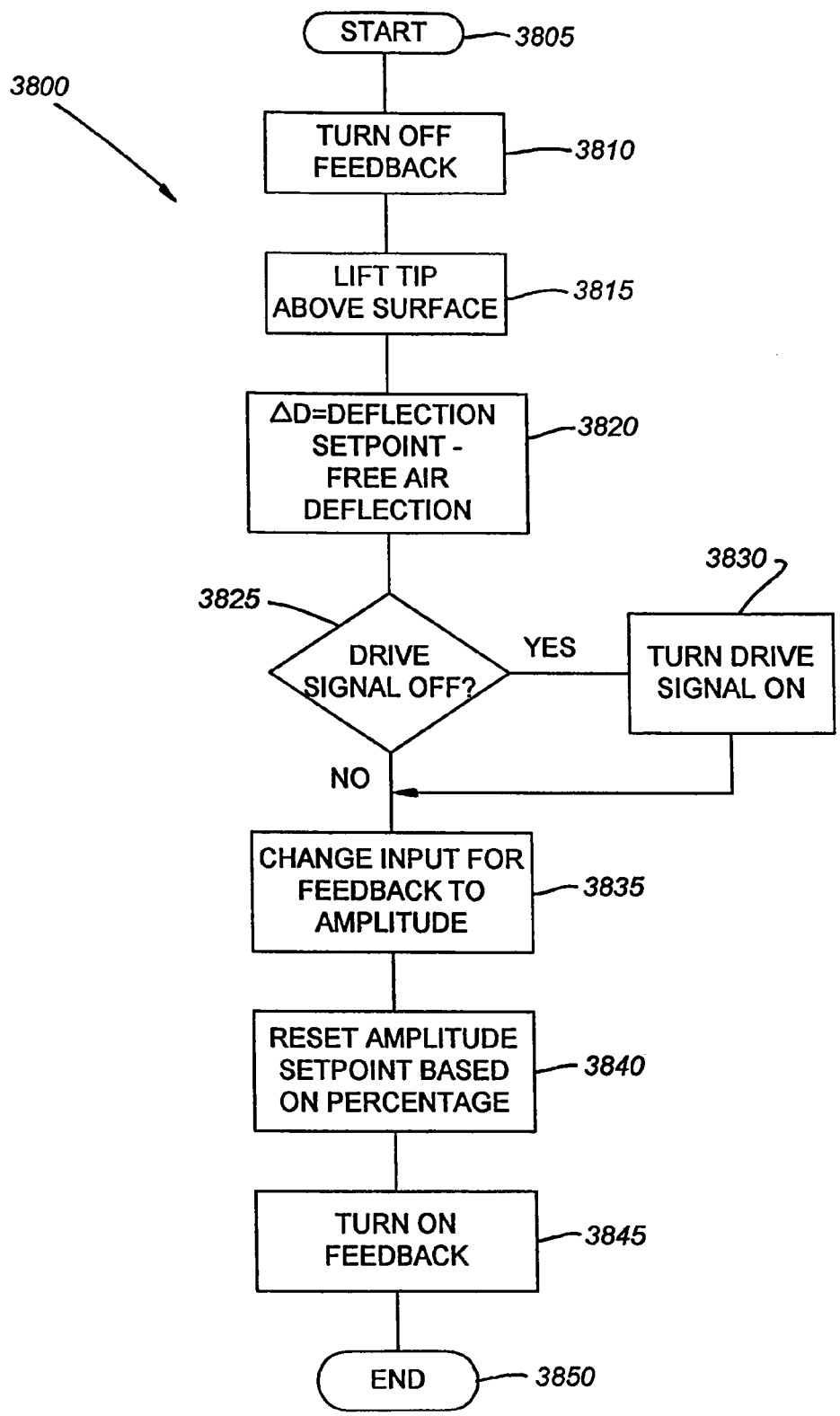
FIG. 38 is an exemplary flowchart outlining the operation of switching between a deflection mode and an amplitude mode according to a one embodiment.

FIG. 38 is an exemplary flowchart 3800 outlining the operation of switching from a deflection mode such as contact mode to an amplitude mode such as TappingMode™ for operating the probe 100 in a probe system 400 according to a preferred embodiment. The flowchart 3800 can be implemented by, for example, the controller 440 illustrated in FIG. 4. Prior to employing the flowchart 3800, the probe 100 can be scanning a sample 410 in contact mode. The flowchart begins at step 3805, for example, in response to a macro script or in response to a user selecting a function on a GUI such as GUI 3400. In step 3810, the controller 440 turns off the feedback of the probe system 400. In step 3815, the controller 440 then lifts the tip(s) of the probe 100 off the surface of the sample 410.

In step 3820, the controller 440 determines the change in deflection, ΔD, of the cantilever of the probe 100. In particular, the controller 440 subtracts the free air deflection the probe 100 encounters off of the sample 410 with the deflection setpoint, which is the deflection set for the probe 100 to encounter on the sample 410 when in contact mode based on, for example, an amount of force between the tip and sample selected by the user. In step 3825, the controller 440 determines if the oscillation drive signal for the probe 100 is off. If the drive signal is off, the controller 440 turns the signal on in step 3830. Typically, the oscillation drive signal will be off when the probe is in contact mode. In step 3835, the controller 440 changes the feedback input for amplitude mode (TappingMode™) operation. In step 3840, the controller resets the amplitude setpoint based on a percentage of the amplitude of probe oscillation and resets the gain values for proper amplitude mode operation. In step 3850, the controller 440 turns the feedback back on. In step 3850, the process ends and the probe 100 is now in amplitude mode operation.

Figure 39:
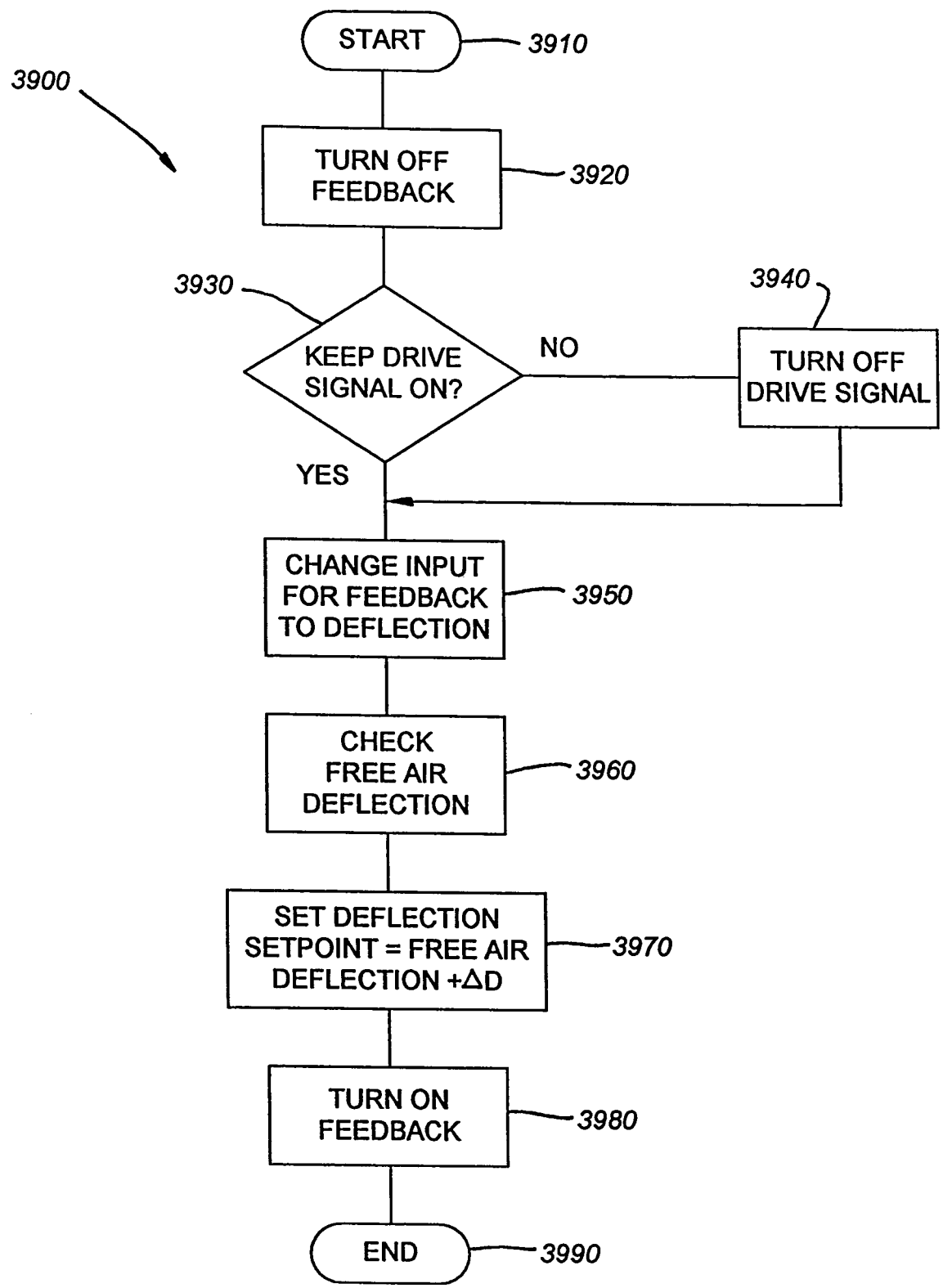
FIG. 39 is an exemplary flowchart outlining the operation of switching between an amplitude mode and a deflection mode according to one embodiment.

FIG. 39 is an exemplary flowchart 3900 outlining the operation of switching from an amplitude mode such as TappingMode™ to a deflection mode such as contact mode for the probe 100 in a probe system 400 according to a preferred embodiment. The flowchart 3900 can be implemented by, for example, the controller 440 illustrated in FIG. 4. Prior to employing the flowchart 3900, the probe 100 can be scanning a sample 410 in amplitude mode. The flowchart begins at step 3910, for example, in response to a macro script or in response to a user selecting a function on a GUI such as GUI 3400. In step 3920, the controller 440 turns off the feedback of the probe system 400. In step 3930, the controller 44 determines whether the oscillation drive signal will be kept on after the probe 100 is switched to contact mode. Typically the oscillation drive signal will not be used in contact mode, and therefore the controller 440 turns off the drive signal in step 3940. In step 3950, the controller 440 changes the input for feedback to deflection mode. In step 3960, the controller 440 determines the free air deflection of the probe 100. In step 3970, the controller 440 determines the deflection setpoint for contact mode. In particular, the controller 440 calculates the deflection setpoint by adding the change in deflection ΔD calculated, for example, in accordance with step 3820 of method 3800 to the free air deflection determined in step 3960. In step 3980, the controller 440 turns on the feedback. In step 3990, the process ends and the probe 100 is now in contact mode operation.

Figure 40:
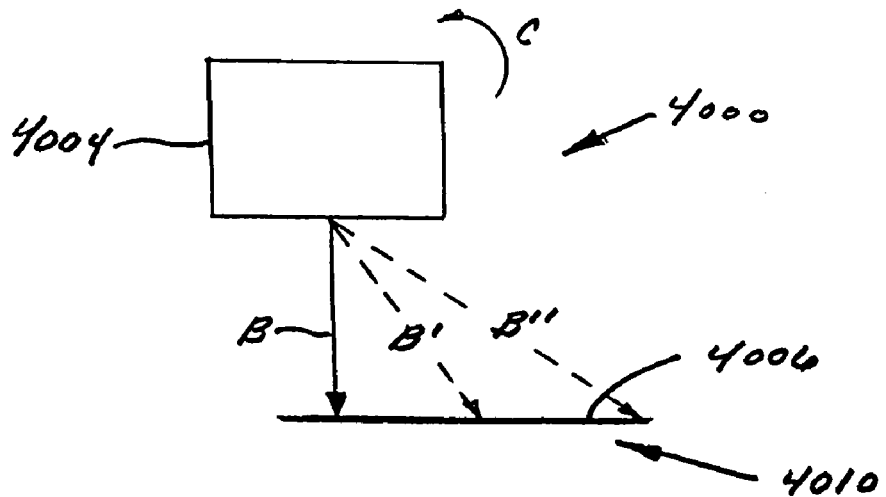
FIG. 40 is a schematic side-elevational view of an apparatus for forming a tip configured for manipulation of a sample, according to an alternate embodiment.
Figure 41:
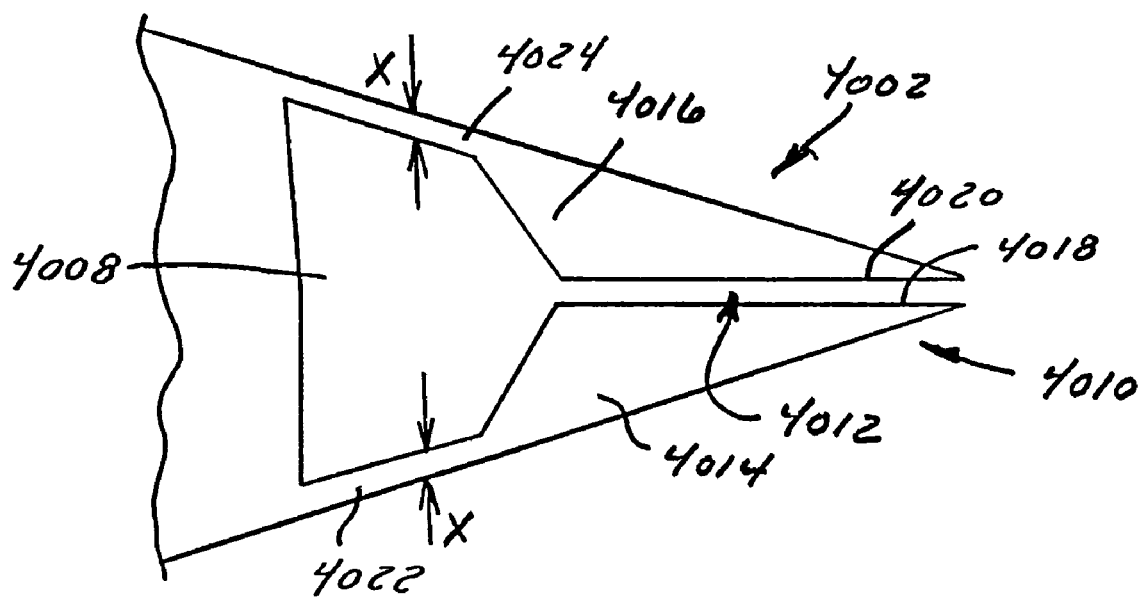
FIG. 41 is a schematic plan view of the tip formed using the apparatus shown in FIG. 40.

Turning next to FIGS. 40 and 41, an alternative method for forming a nanomanipulation tip 4002 according to the present invention is shown. In FIG. 40, apparatus 4000 for forming tip 4002 includes a milling source 4004, such as a focused ion beam source, that generates a beam "B" that initially is directed toward a, for example, conventional SPM tip 4006 made of a material such as silicon. To produce tip 4002 (FIG. 41), the method initially includes creating an opening 4008 in tip 4006 with beam B of an appropriate dose. Beam B is translated toward a free end 4010 of tip 4006 to create a narrow opening 4012 and tip 4006, thus forming two "arms" 4014, 4016 having generally opposed faces 4018, 4020, respectively. The forming of narrow opening 4012 may be effectuated by rotating ion beam source 4004 in a direction labeled "C" in FIG. 40 so that beam "B" moves along the length of tip 4006 (illustrated by sequential beams "B'" and "B''" shown in phantom) and through the apex at a selected rate so opening 4012 is configured as shown in FIG. 41. Other methods could be used, such as translating the SPM tip 4006 relative to the beam, or moving the entire source 4004 along the length of the tip.

Figure 44:
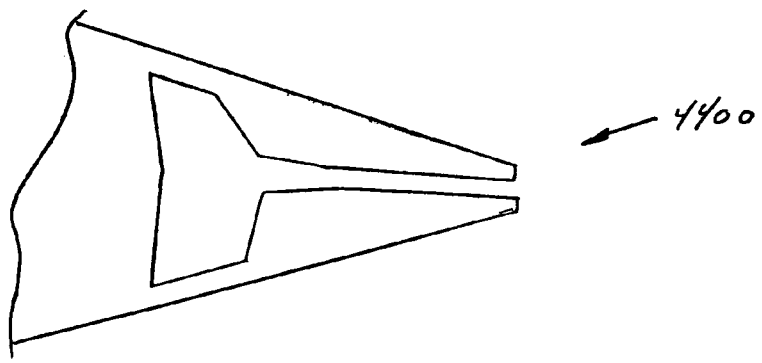
FIG. 44 is an SEM photograph of an exemplary probe fabricated according to an alternate embodiment.

Notably, opening 4008 is formed sufficiently large so that "weak" or flexure points 4022, 4024 are created. Flexure points 4022, 4024 allow translation (e.g., rotation) of arms 4014, 4016 so that at least a portion of faces 4018, 4020 can be brought into contact with one another. As a result, nanomanipulation tip 4002 can be used to both image and manipulate nanoscale objects, as described above. In this regard, electrodes (not shown) are placed on arms 4014, 4016 (preferably adjacent free end 4010 of tip) to allow actuation thereof with appropriately applied voltages, again as described above. An SEM photograph of the probe fabricated using this technique is shown in FIG. 44. It may be noted that the figure shows only the apex of the tip that has been milled.

Figure 42:
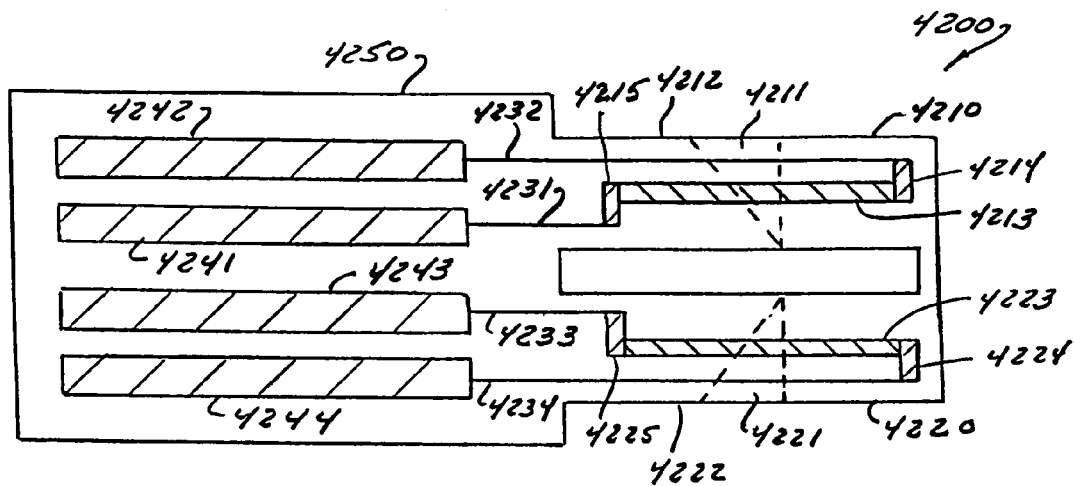
FIG. 42 is an exemplary illustration of a probe system according to an alternate embodiment.

FIG. 42 is an exemplary illustration of plan view of a probe system 4200 according to an alternate embodiment. The probe system 4200 includes a first probe assembly 4210 and a second probe assembly 4220. The first probe assembly 4210 includes a tip 4211, a cantilever 4212, a probe actuator 4213, and contacts 4214 and 4215. The second probe assembly 4220 includes a tip 4221, a cantilever 4222, a probe actuator 4223, and contacts 4224 and 4225. The probes assembly 4210 and assembly 4220 can extend from the same silicon base 4250. The probe system 4200 also includes metal pads 4241–4244 and metal lines 4231–4234. The probe system 4200 can be manufactured by a lithographic and etching process similar to the one disclosed above with respect to other probes.

In operation, one tip 4211 can be used to image a sample and the other tip 4221 can be used to manipulate a sample. In particular, one tip can be raised, for example, by applying a voltage to metal pads 4241 and 4242. This voltage can then actuate the actuator 4213 through the contacts 4214 and 4215. The actuator 4213 can be a thermal actuator, a piezoelectric actuator, or any device that can be useful for adjusting a position of the probe assembly 4210. The actuator 4213 can then raise the probe assembly 4210 from the surface of a sample so that the other probe assembly 4220 is in contact with the sample for imaging or for manipulation. Alternately, the actuator 4213 can lower the probe assembly 4210 so that it is in contact with the sample for imaging or manipulation. This can provide for one imaging probe and one manipulation probe in close proximity. For example, the probes can be less than 20 microns apart. Preferably, the probes are less than 10 microns apart or are even less than 5 microns apart. According to another embodiment, one probe may include an actuator and one probe does not. According to the illustrated embodiment, one probe can be adjusted in one direction and the other probe can be adjusted in the other direction for alternating between imagine and manipulation. Thus, this embodiment provides for positioning and removal of one probe on the surface for imaging and the positioning and removal of another probe on the surface for manipulation. Additionally, only one probe may be on the surface at a time.

Figure 43:
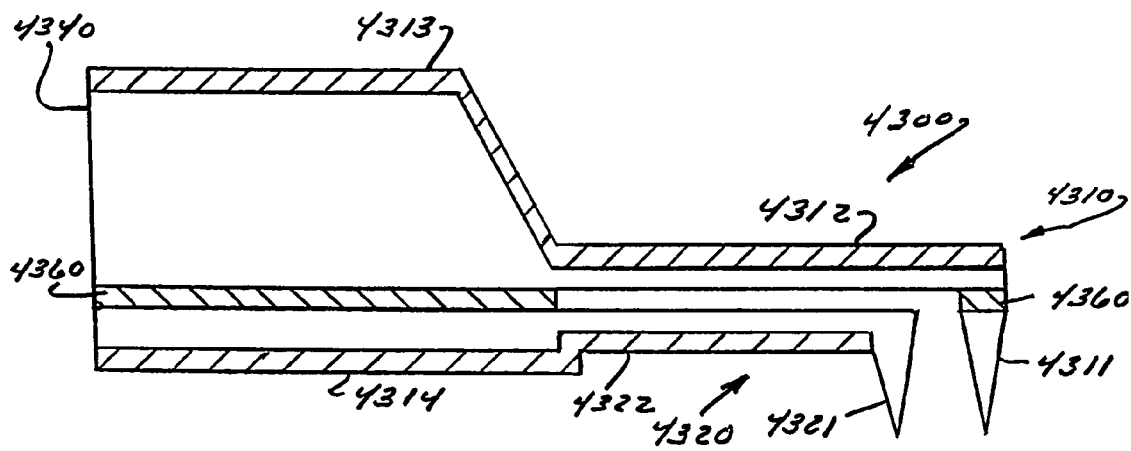
FIG. 43 is an exemplary illustration of a probe system according to an alternate embodiment.

FIG. 43 is an exemplary illustration of a probe system 4300 according to an alternate embodiment. The probe system 4300 can include probes 4310 and 4320. The probe 4310 can include a tip 4311 and a cantilever 4312. The probe 4320 can include a tip 4321 and a cantilever 4322. The probes 4310 and 4320 can extend from the same silicon base 4340. The probe system 4300 can also include metal layers 4313 and 4314. The probe system 4300 can further include an oxide layer 4360 formed as a result of an etching process similar to the one disclosed above and used to form the probes 4310 and 4320.

In operation, one probe is used to image the surface and another probe is used to manipulate the surface. A differential voltage can be applied between the metal layers 4313 and 4314 to adjust a position of the probes 4310 and 4320. Alternately, the probes can be adjusted using piezoelectric actuators, using thermal actuators, or using any other method for adjusting the position of the probes 4310 and 4320. Thus, one probe can be removed from a sample when the other is used to image the sample. Then, the other probe can be removed from the sample while the one probe is used to manipulate the sample. Thus this embodiment also provides for one imaging probe and one manipulation probe in close proximity. For example, the probes can be less than 20 microns apart. Preferably, the probes are less than 10 microns apart or are even less than 5 microns apart. This embodiment also employs similar features to the other disclosed probe embodiments.

Thus, the embodiments disclosed in FIGS. 42 and 43 provide a scanning probe microscope for imaging and manipulating a sample that includes a first tip, a second tip, and an actuator coupled to the first tip, the actuator being configured to adjust the position of the first tip to a first position for imaging the sample with the scanning probe microscope and to adjust the position of the first tip to a second position for manipulating the sample with the scanning probe microscope. The scanning probe microscope can also include a base, wherein the first tip is coupled to the base and the second tip is coupled to the base. The first tip can be an imaging tip, the second tip can be a manipulation tip, and the actuator can be configured to adjust the position of the imaging tip to an imaging position for imaging the sample with the imaging tip and the actuator is configured to adjust the position of the imaging tip away from the sample for manipulating the sample with the manipulation tip. Alternatively, the first tip can be a manipulation tip, the second tip can be an imaging tip, and the actuator can be configured to adjust the position of the manipulation tip to a manipulation position for manipulating the sample with the manipulation tip and the actuator is configured to adjust the position of the manipulation tip away from the sample for imaging the sample with the imaging tip. The actuator can adjust the position of the first tip in response to at least one of a voltage differential applied to the actuator and a thermal differential applied to the actuator. Accordingly, using one probe for imaging and another probe for manipulation can reduce or eliminate the contamination of the imaging probe from manipulation.

While this invention has been described with specific embodiments thereof, it is evident that many alternatives, modifications, and variations will be apparent to those skilled in the art. For example, various features of the embodiments are interchangeable with various similar features of other disclosed embodiments. Thus, all of the features disclosed with respect to each embodiment can be applied to the other embodiments to achieve desirable results. Accordingly, the preferred embodiments of the invention as set forth herein are intended to be illustrative, not limiting. Various changes may be made without departing from the spirit and scope of the invention.

What is claimed is:

1. A method of interacting with a surface of a sample, the method comprising:
   oscillating a probe;
   scanning at least a region of the sample with the oscillating probe while monitoring probe oscillation;
   generating an image based on said monitoring step;
   switching to a contact mode in which a tip of the probe generally continuously contacts the surface;
   manipulating the sample after said switching step;
   wherein said manipulating step includes performing dip pen lithography.

2. The method of claim 1, wherein said scanning step is performed in a tapping mode.

3. The method of claim 1, wherein said scanning step is performed in a non-contact mode.

4. A method of interacting with a surface of a sample the method comprising:
   oscillating a probe;
   scanning at least a region of the sample with the oscillating probe while monitoring probe oscillation;
   generating an image based on said monitoring step;
   switching to a contact mode in which a tip of the probe generally continuously contacts the surface;
   manipulating the sample after said switching step;
   further comprising switching to a tapping mode of operation after said manipulating step.

5. The method of claim 4, further comprising positioning the probe at a region of interest based on said generating step.

6. The method of claim 4, wherein said manipulating step includes at least one of a group including moving the sample and modifying the sample.

7. The method of claim 4, further comprising generating a second image of the region in response to said switching to a tapping mode step.

8. The method of claim 4, wherein said scanning step provides relative scanning motion between the probe and the sample.

9. The method of claim 8, wherein said scanning step includes moving the probe.

10. The method of claim 4, wherein said manipulating step further comprises manipulating the surface of the sample with a probe other than the probe used to scan the region.

11. The method of claim 4, wherein said manipulating step comprises moving surface particles of the sample with the probe.

12. The method of claim 4, wherein said scanning step is disabled during said manipulating step.

13. A method of interacting with a surface of a sample, the method comprising:
   oscillating a probe;

scanning at least a region of the sample with the oscillating probe while monitoring probe oscillation;

generating an image based on said monitoring step;

switching to a contact mode in which a tip of the probe generally continuously contacts the surface;

manipulating the sample after said switching step;

selecting a subregion of the region of the sample such that the selected subregion substantially encloses only a modified portion of the manipulated sample, after said manipulating step; and scanning the selected subregion of the region of the sample.

14. The method of claim 13, further comprising:

manipulating the subregion of the region of the sample with the probe, and rescanning the manipulated subregion of the sample.

15. The method of claim 13, further comprising switching between contact mode and amplitude mode by:

deactivating the feedback of a controller used to maintain a contact mode setpoint;

transmitting an amplitude setpoint to the controller, the amplitude setpoint being based on a free air amplitude and an amount of deflection in contact mode; and using the controller to maintain probe oscillation at the amplitude setpoint.

16. The method of claim 15, wherein said manipulating step includes at least one of a group including applying a force to the sample and modifying the sample.

17. An apparatus for manipulating a sample with a probe the apparatus comprising:

a probe;

a controller that generates control signal to maintain a setpoint of SPM operation in a first mode while the probe manipulates at least a region of the sample;

wherein the controller switches SPM operation from the first mode to a second mode in which the probe is oscillated;

a scanner to provide relative scanning motion between the probe and the sample over the region; and wherein said scanner scans a sub-region of the manipulated region while said controller generates control signals to maintain a setpoint of oscillation in the tapping mode.

18. The apparatus of claim 17, wherein the first mode is a contact mode and the second mode is a tapping mode.

19. The apparatus of claim 17, wherein the probe includes a cantilever, a first tip supported by the cantilever; and a second tip supported by the cantilever, the first and the second tips being configured to combine to form an imaging tip.

20. The apparatus of claim 17, wherein the tapping mode control signals are indicative of at least one characteristic of the sample.

21. The apparatus of claim 17, wherein the manipulated sample is either moved or modified.

22. An apparatus for manipulating a sample with a probe, the apparatus comprising:

a probe;

a controller that generates control signals to maintain a setpoint of SPM operation in a first mode while the probe manipulates at least a region of the sample;

wherein the controller switches SPM operation from the first mode to a second mode in which the probe is oscillated; and wherein the sample is manipulated in response to dip pen lithography.

23. The apparatus of claim 22, wherein the second mode is a non-contact mode.

24. A method of interacting with a sample using a prove of a metrology instrument, the method comprising:

operating the metrology instrument in a contact mode in which the probe generally continuously contacts the sample;

manipulating the sample with the probe; and then switching the mode of operation of the metrology instrument to an oscillating mode, wherein said switching step includes oscillating the probe; and wherein said manipulating step includes performing dip pen lithography.

25. The method of claim 24, wherein the oscillating mode is a tapping mode.

26. The method of claim 24, wherein said manipulating step includes at least one of a group including moving the sample and modifying the sample.

27. A method of interacting with a sample using a probe of a metrology instrument, the method comprising:

operating the metrology instrument in a contact mode in which the probe generally continuously contacts the sample;

manipulating the sample with the probe; and then switching the mode of operation of the metrology instrument to an oscillating mode, wherein said switching step includes oscillating the probe; and further comprising manipulating the sample again in the contact mode after said switching step, wherein said second manipulating step includes manipulating a subregion of the sample that encloses a manipulated portion of the sample resulting from said first manipulating step.

28. The method of claim 27, further comprising:

selecting a second subregion of the sample after said second manipulating step; and scanning the selected second subregion of the region of the sample.

29. The method of claim 27, wherein the probe comprises:

a cantilever;

a first tip supported by the cantilever; and a second tip supported by the cantilever, the first and the second tip being configured to combine to form an imaging tip.

30. The method of claim 29, further comprising applying a voltage across the first tip and the second tip to combine the first tip and the second tip to form an imaging tip.

* * * * *

UNITED STATES PATENT AND TRADEMARK OFFICE
CERTIFICATE OF CORRECTION

| | |
|---|---|
| PATENT NO. | : 7,040,147 B2 |
| APPLICATION NO. | : 11/075019 |
| DATED | : May 9, 2006 |
| INVENTOR(S) | : Chand et al. |

It is certified that error appears in the above-identified patent and that said Letters Patent is hereby corrected as shown below:

ON THE TITLE PAGE, ITEM (57):

Line 12 of the Abstract, delete "preferable" and substitute therefore -- preferably --.

CLAIM 24
Col. 30, Line 11      Delete "prove" and substitute therefore -- probe --.

Signed and Sealed this

Twenty-sixth Day of December, 2006

JON W. DUDAS
*Director of the United States Patent and Trademark Office*